(12) United States Patent
Abiko

(10) Patent No.: US 8,983,143 B2
(45) Date of Patent: Mar. 17, 2015

(54) BIOMETRIC AUTHENTICATION DEVICE, BIOMETRIC AUTHENTICATION METHOD AND COMPUTER PROGRAM FOR BIOMETRIC AUTHENTICATION

(71) Applicant: Fujitsu Limited, Kawasaki-shi, Kanagawa (JP)

(72) Inventor: Yukihiro Abiko, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 51 days.

(21) Appl. No.: 13/965,440

(22) Filed: Aug. 13, 2013

(65) Prior Publication Data

US 2013/0329967 A1    Dec. 12, 2013

Related U.S. Application Data

(63) Continuation of application No. PCT/JP2011/053172, filed on Feb. 15, 2011.

(51) Int. Cl.
*G06K 9/00* (2006.01)

(52) U.S. Cl.
CPC ........ *G06K 9/00006* (2013.01); *G06K 9/00026* (2013.01)
USPC ........................................ 382/115

(58) Field of Classification Search
None
See application file for complete search history.

(56) References Cited

U.S. PATENT DOCUMENTS

| | | | |
|---|---|---|---|
| 6,917,694 B1 | 7/2005 | Machida et al. | |
| 8,666,121 B2 * | 3/2014 | Muquit et al. | 382/115 |
| 8,705,806 B2 * | 4/2014 | Nakano et al. | 382/115 |
| 2005/0084155 A1 | 4/2005 | Yumoto et al. | |
| 2010/0208947 A1 * | 8/2010 | Muquit et al. | 382/115 |
| 2010/0239128 A1 * | 9/2010 | Mohammad et al. | 382/115 |

FOREIGN PATENT DOCUMENTS

| | | |
|---|---|---|
| JP | 2001-034766 | 2/2001 |
| JP | 2003-051013 | 2/2003 |
| JP | 2004-021615 | 1/2004 |
| JP | 2005-149455 | 6/2005 |

(Continued)

OTHER PUBLICATIONS

International Search Report, mailed in connection with PCT/JP2011/053172 and mailed Mar. 15, 2011.

*Primary Examiner* — Stephen R Koziol
*Assistant Examiner* — Amandeep Saini
(74) *Attorney, Agent, or Firm* — Fujitsu Patent Center

(57) ABSTRACT

A biometric authentication device including: a biometric information acquiring unit which generates a plurality of partial images, each of the partial images capturing a portion of biometric information of a user different from each other; a correlation value calculation unit which calculates the correlation value between a portion of biometric information represented on one partial image and registered biometric information; a partial similarity update unit which, based on the correlation value for the one partial image and the correlation value for at least one other partial image acquired before the one partial image, updates partial similarity representing the degree of similarity between the registered biometric information and portions of biometric information represented on the one partial image and the at least one other partial image; an authentication unit which authenticates, when the partial similarity is equal to or higher than an authentication judging threshold, the user as the registered user.

24 Claims, 11 Drawing Sheets

(56) References Cited

FOREIGN PATENT DOCUMENTS

| | | |
|---|---|---|
| JP | 2006-012031 | 1/2006 |
| JP | 2006-221256 | 8/2006 |
| JP | 2007-265022 | 10/2007 |
| JP | 2009-031986 | 2/2009 |

\* cited by examiner

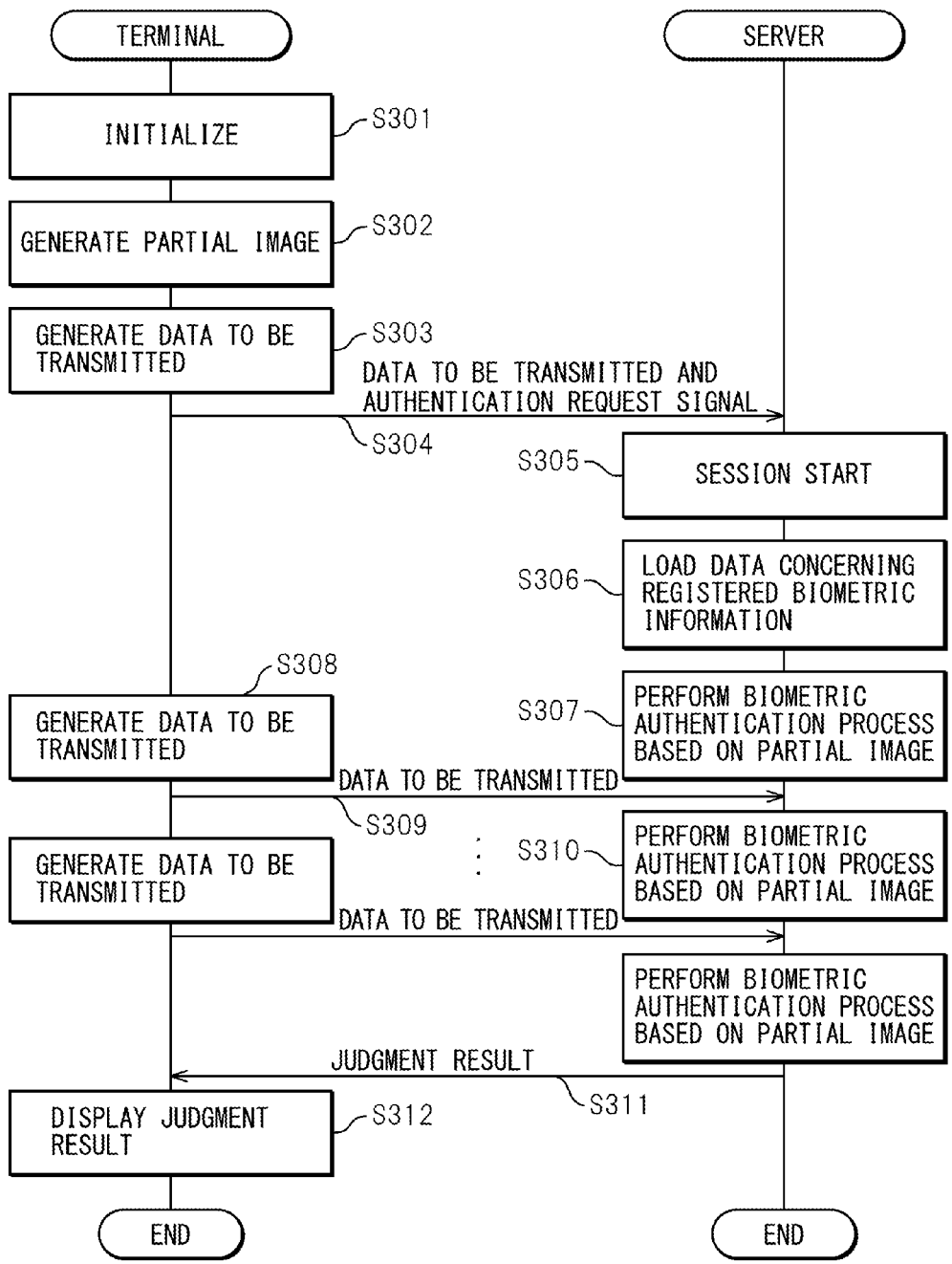

BIOMETRIC AUTHENTICATION DEVICE, BIOMETRIC AUTHENTICATION METHOD AND COMPUTER PROGRAM FOR BIOMETRIC AUTHENTICATION

CROSS-REFERENCE TO RELATED APPLICATION

This application is a continuation application and is based upon PCT/JP2011/053172, filed on Feb. 15, 2011, the entire contents of which are incorporated herein by reference.

FIELD

The present invention relates to, for example, a biometric authentication device, a biometric authentication method and a computer program for biometric authentication which use a biometric image representing biometric information for biometric authentication.

BACKGROUND

In recent years, enhance security has been sought for information appliances. In particular, portable information appliances such as cellular phones, smartphones or tablet-type or note-type personal computers have a high risk of being misplaced or stolen. For this reason, portable information appliances must have a highly-reliable personal authentication function.

For such demands, a biometric authentication technology in which, based on a biometric image containing biometric information such as vein pattern of a hand or a finger, fingerprint or palmprint, a user of a device or a system is authenticated has been developed. In biometric authentication technology, biometric information of a user is utilized for personal authentication. For this reason, it is difficult for a person other than a user to utilize without permission from the user an information appliance having a personal authentication function employing a biometric authentication technology having a sufficiently high authentication accuracy.

On the other hand, regarding portable information appliances, in order to miniaturize the device, the device may have a limited hardware resource in some cases. Since portable information appliances are powered by an internal battery, the information appliances are equipped with a processor having a small power consumption. A processor having a small power consumption has a relatively low throughput. In order to not compromise the convenience of portable information appliances, a biometric authentication process is preferably completed in a short time. For this reason, a biometric authentication technology in which the authentication accuracy is high and the load on a processor is small is demanded for portable information appliances. For the purpose of fulfilling such demands, a variety of biometric authentication technologies have been proposed (for example, see Japanese Laid-open Patent Publication No. 2004-21615, Japanese Laid-open Patent Publication No. 2009-31986, Japanese Laid-open Patent Publication No. 2005-149455, and Japanese Laid-open Patent Publication No. 2006-221256).

For example, in the technique disclosed in Japanese Laid-open Patent Publication No. 2004-21615, partial images of a subject acquired in a predetermined order are matched with a plurality of preregistered partial images in accordance with the acquisition order.

In the technique disclosed in Japanese Laid-open Patent Publication No. 2009-31986, a matching target body part in a finger vein pattern is randomly determined in response to an authentication request. A portion of the finger vein pattern corresponding to the matching target body part is matched once or a plurality of times with a corresponding portion of a finger vein pattern stored in a vein database. When the entire finger vein pattern is matched, for a finger matched by using a portion of the finger vein pattern, matching is performed once or a plurality of times by using the whole finger vein pattern to be authenticated when all are matched.

Further, in the technique disclosed in Japanese Laid-open Patent Publication No. 2005-149455, the feature value of each partial image for each of two images is determined. For each partial image in one image, the position of a partial image which has the maximum degree of matching therewith in the other image is then searched. The similarity between the two images is calculated based on information relating to the partial region whose a positional relationship quantity is in a predetermined range. The positional relationship quantity represents a relationship between a reference position for measuring the position of a partial region in one image and the position of the other image corresponding to the partial region which has the maximum degree of matching. Based on the similarity, it is judged that two images match each other or not.

Further, in the technique disclosed in Japanese Laid-open Patent Publication No. 2006-221256, a pattern information is extracted from each of a plurality of images. Each extracted pattern information is sequentially matched with registered pattern information, and the matching process is stopped when a matching result is obtained in which the extracted pattern information represents the authentication target corresponding to the registered pattern information.

SUMMARY

In the technique disclosed in Japanese Laid-open Patent Publication No. 2004-21615, since not only biometric information itself, but also the order of acquiring an image is utilized for matching, the security is enhanced. However, in the technique disclosed in Japanese Laid-open Patent Publication No. 2004-21615, a user makes a sensor to read biometric information many times, and every time biometric information is read, a matching process is performed. Therefore, it takes a long time for an authentication process to be completed, which is time consuming for a user.

In the technique disclosed in Japanese Laid-open Patent Publication No. 2009-31986, since not only a portion of biometric information of a certain body part is matched, but also overall biometric information of the body part is used for a matching process, the operational load on a processor is large. As the result, it takes a long to complete the authentication process.

On the other hand, in the technique disclosed in Japanese Laid-open Patent Publication No. 2005-149455 or Japanese Laid-open Patent Publication No. 2006-221256, since an authentication process may be completed by using one or a plurality of partial images representing a portion of biometric information of a certain body part, the operational load on a processor is reduced. However, as mentioned above, since hardware resources of portable information appliances are limited, the operational load on a processor is preferably reduced.

According to one embodiment, a biometric authentication device is provided. The biometric authentication device includes: a biometric information acquiring unit which generates a plurality of partial images, each of the partial images capturing a portion of biometric information of a user different from each other; a storage unit which stores data concerning registered biometric information of a registered user; a correlation value calculation unit which, when receiving one partial image of the plurality of partial images from the biometric information acquiring unit, calculates a correlation value between a portion of biometric information represented on the one partial image and the registered biometric information; a partial similarity update unit which, based on the correlation value for the one partial image and the correlation value for at least one other partial image acquired before the one partial image, updates partial similarity representing the degree of similarity between the registered biometric information and portions of biometric information represented on the one partial image and the at least one other partial image; an authentication unit which authenticates, when the partial similarity is equal to or higher than an authentication judging threshold, the user as a registered user; and an image loading unit which loads the next partial image of the one partial image from the biometric information acquiring unit when the partial similarity is lower than the authentication judging threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a timing diagram of a process performed on a terminal and a server when a biometric authentication process is performed on a computer system.

DESCRIPTION OF EMBODIMENTS

In the following, biometric authentication devices according to a variety of embodiments will be explained with reference to the drawings.

In order for a user to perform a biometric authentication process, the biometric authentication device sequentially acquires a partial image representing a portion of biometric information of the user. The biometric authentication device utilizes the relative positional relationship between portions of biometric information represented on the partial image and features of biometric information represented on each partial image to calculate the partial similarity between the portions of biometric information and a registered biometric information of a registered user who is a preregistered user. At that time, the biometric authentication device updates the partial similarity which has been calculated by taking into account the features of biometric information represented on a newly acquired partial image every time the biometric authentication device additionally acquires a new partial image. The biometric authentication device compares the partial similarity with a threshold every time the partial similarity is updated, and authenticate the user at the time when the partial similarity is equal to or higher than a threshold to thereby stop the biometric authentication process.

In embodiments described in the specification, the biometric authentication device utilizes a fingerprint of a finger as a biometric information which is to be a target for biometric authentication.

However, the biometric information which is a target for biometric authentication may be other biometric information represented by a still image such as a palmprint or a vein pattern.

In the specification, the term "matching process" is used for referring to a process for calculating a similarity representing the degree of similarity between a biometric information of a user and a registered biometric information. The term "biometric authentication process" is used for referring to not only a matching process, but also an entire authentication process including a process in which whether a user is authenticated or not is determined by utilizing the result of the matching process.

Figure 1:
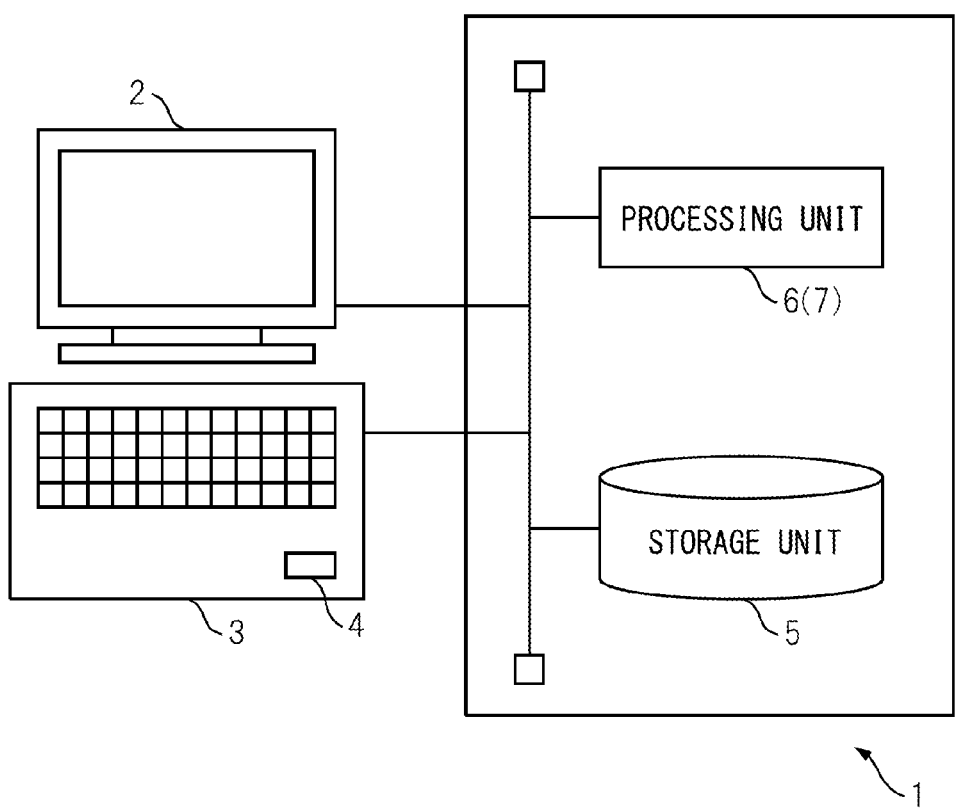
FIG. 1 is a diagram schematically illustrating a biometric authentication device.

FIG. 1 is a diagram schematically illustrating a biometric authentication device according to a first embodiment. As illustrated in FIG. 1, the biometric authentication device 1 includes a display unit 2, an input unit 3, a biometric information acquiring unit 4, a storage unit 5, and a processing unit 6. The display unit 2, the input unit 3, and the biometric information acquiring unit 4 may be arranged separately from a housing accommodating the storage unit 5 and the processing unit 6. Alternatively, the display unit 2, the input unit 3, the biometric information acquiring unit 4, the storage unit 5 and the processing unit 6 may be accommodated in one housing such as a note-type personal computer or a tablet-type terminal.

The biometric authentication device 1 sequentially generates a plurality of partial images, each of the partial images representing a portion of a fingerprint of a user by the biometric information acquiring unit 4, and performs a biometric authentication process by using the partial images. When the biometric authentication device 1 authenticates the user as anyone of registered users as the result of the biometric authentication process, the user is permitted to use a device on which the biometric authentication device 1 is mounted. Alternatively, the biometric authentication device 1 transmits a signal representing that a user is authenticated to the other device which is not illustrated, and permits the user to use the other device.

The display unit 2 includes a display device such as a liquid crystal display or an organic electroluminescence display. The display unit 2 displays, for example, a guidance message for a user such that a finger is arranged on a position where the biometric information acquiring unit 4 can acquire an appropriate partial image. The display unit 2 displays a message indicating the result of biometric authentication process performed by the processing unit 6, or a variety of application-related informations.

The input unit 3 includes a user interface such as a keyboard, a mouse, or a touchpad. An identification information of a user such as a user name input by the user via the input unit 3, command or data is passed to the processing unit 6. It is noted that, when the user does not need input information other than biometric information to the biometric authentication device 1, the input unit 3 may be omitted.

In the present embodiment, the biometric information acquiring unit 4 is integrally formed with the input unit 3, and arranged at the vicinity of the right end of a palm rest portion of the input unit 3. However, the arrangement of the biometric information acquiring unit 4 is not limited to this example. For example, the biometric information acquiring unit 4 may be arranged at the vicinity of the left end of the palm rest portion. The biometric information acquiring unit 4 may be separated from the input unit 3.

The biometric information acquiring unit 4 includes, for example, a slide type fingerprint sensor. The fingerprint sensor may be a sensor employing any one of, for example, optical, capacitance, electric field or thermal type. The biometric information acquiring unit 4 generates sequentially a partial image every a predetermined time interval while the user slides a finger on the sensor. Partial image represents a portion of the fingerprint of the surface of the finger. By connecting a plurality of partial images in the order in which the partial images are generated, a biometric image which represents the entire fingerprint is composed.

Figure 2:
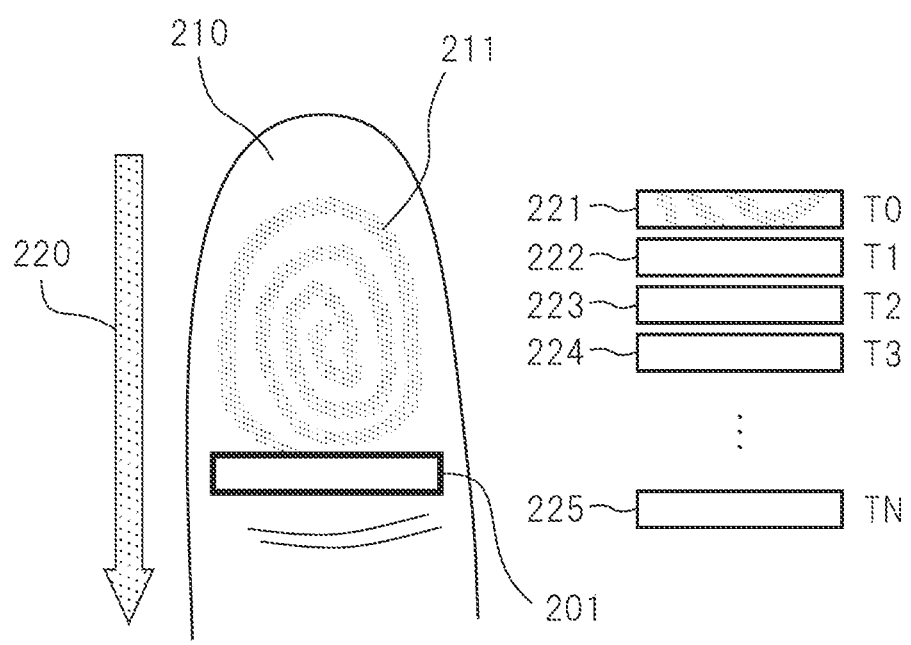
FIG. 2 is a diagram illustrating an example of the positional relationship between a sensor surface of a slide-type sensor which a biometric information acquiring unit has and a fingerprint, and a partial image to be generated.

FIG. 2 is a diagram illustrating examples of the positional relationship between the sensor surface of a slide-type sensor which the biometric information acquiring unit 4 includes and a fingerprint, and partial images to be generated. As illustrated in FIG. 2, the width of a sensor surface 201 of the slide-type sensor in the horizontal direction is wider than the size of a fingerprint 211 utilized in a matching process in the shorter direction; on the other hand, the height of the sensor surface 201 in the vertical direction is smaller than the size of the fingerprint 211 in the longer direction. In this example, the longer direction of the fingerprint 211 is a direction from the base of the finger to the fingertip; the shorter direction of the fingerprint 211 is a direction orthogonal to the longer direction of the fingerprint 211. For example, a user approximates the base of the finger 210 including the fingerprint 211 to the sensor surface 201 first, and after that, moves the finger 210 along the direction represented by an arrow 220 such that the tip of the finger 210 gradually approaches the sensor surface 201 along the longer direction of the fingerprint 211. In this case, at the initial time T0, a partial image 221 which represents a portion of the base side of the fingerprint 211 is generated. Regarding partial images 222 to 225 generated at times T1 to TN, the image generated at later time represents a portion of the fingerprint 211 of the finger closer to the tip.

The biometric information acquiring unit 4 passes the partial image to the processing unit 6 every time the partial image is generated. The biometric information acquiring unit 4 may notify the reading start time or the reading completion time of the partial image together with the partial image to the processing unit 6.

The storage unit 5 includes, for example, at least any one of a semiconductor memory, a magnetic disk device, and an optical disk device. The storage unit 5 stores an application program which is used in the biometric authentication device 1, a user name, a user identification number and personal setting information of at least one registered user, and a variety of data. The storage unit 5 stores a program for performing a biometric authentication process. Further, the storage unit 5 stores, for each registered user, data concerning a fingerprint of a specified finger which is registered biometric information of the registered user together with identification information of the registered user such as a user name or a password of the registered user. Data concerning the registered biometric information includes, for example, features concerning registered biometric information. The feature include, for example, the type and the position of a minutia such as ridge endings or bifurcations and the local ridge line direction extracted from a registered biometric image which is an image representing registered biometric information. Alternatively, data concerning registered biometric information may be a registered biometric image itself.

Data concerning the registered biometric information may be encoded by a predetermined compression coding method, and the encoded data may be stored in the storage unit 5 together with identification information. Further, in order to enhance security against a leak of information, data concerning the identification information and the registered biometric information of a registered user may be encrypted according to a predetermined encryption method, and the encrypted data may be stored in the storage unit 5.

Further, the storage unit 5 stores a plurality of partial images acquired from the biometric information acquiring unit 4 when a biometric authentication process is performed, together with related information such as the receiving time of each partial image or relative position information with a portion of biometric information represented on other partial image. Further, the storage unit 5 also stores information concerning connection candidates which are a set of matching candidate positions each representing the position of a portion whose registered biometric information is similar to a portion of biometric information represented on each partial image. The detail of matching candidate position and the connection candidate will be mentioned below.

The processing unit 6 includes one or a plurality of processors, timers and peripheral circuits thereof. The processing unit 6 performs a biometric authentication process using a plurality of partial images acquired from the biometric information acquiring unit 4.

Figure 3:
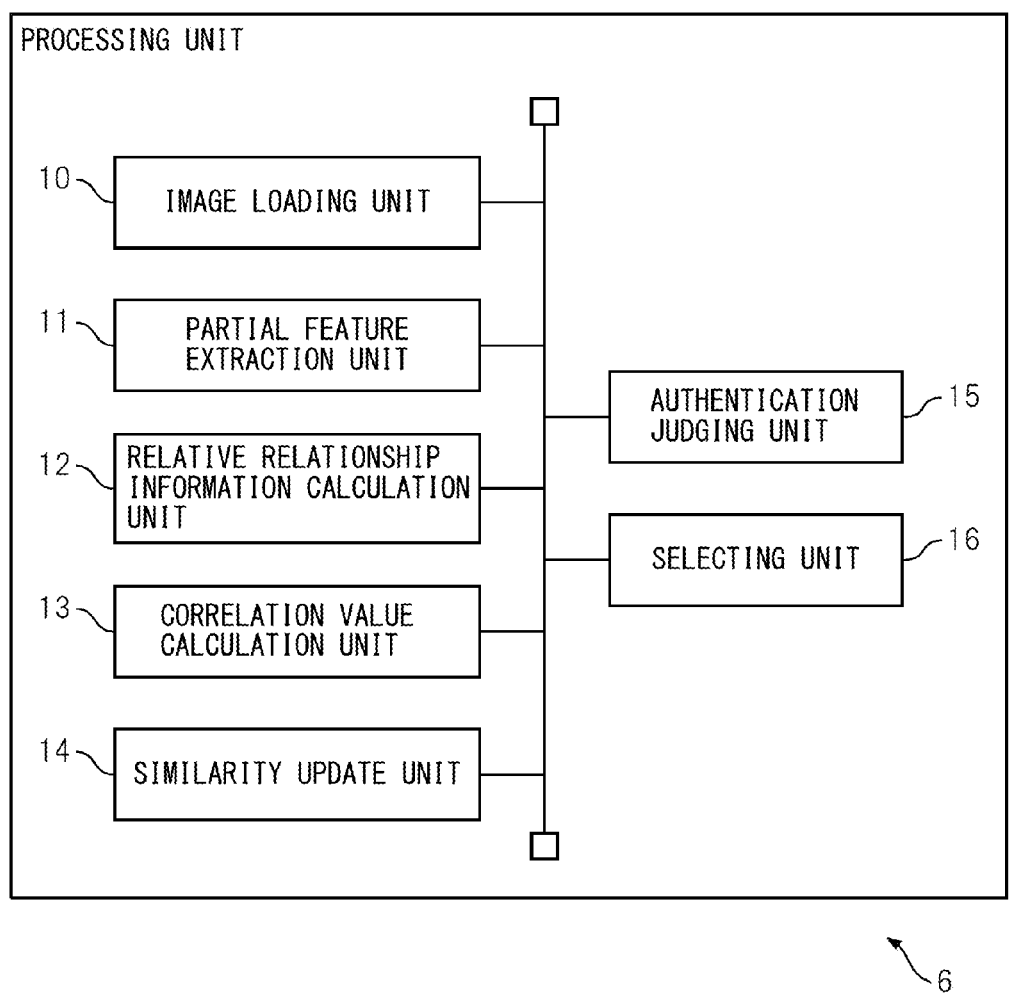
FIG. 3 is a functional block diagram of a processing unit of a biometric authentication device according to a first embodiment.

FIG. 3 is a functional block diagram of the processing unit 6. As illustrated in FIG. 3, the processing unit 6 includes an image loading unit 10, a partial feature extraction unit 11, a relative relationship information calculation unit 12, a correlation value calculation unit 13, a similarity update unit 14, an authentication judging unit 15 and a selecting unit 16. Each unit that the processing unit 6 includes is a functional module implemented by a computer program performed on a processor that the processing unit 6 includes. Alternatively, each unit that the processing unit 6 includes may be mounted on the biometric authentication device 1 as a firmware.

The processing unit 6 stores a partial image together with the receiving time thereof into the storage unit 5 every time the processing unit 6 receive the partial image from the biometric information acquiring unit 4. When the processing unit 6 is notified from the biometric information acquiring unit 4 a reading start time or a reading completion time of the partial image, the processing unit 6 may store the reading start time or the reading completion time into the storage unit 5.

The image loading unit 10 loads a partial image one by one from the storage unit 5, and passes the partial image to the partial feature extraction unit 11 and the relative relationship information calculation unit 12. Further, the image loading unit 10 also reads the receiving time of the read partial image from the storage unit 5, and notifies the receiving time to the relative relationship information calculation unit 12. Alternatively, the image loading unit 10 reads a reading start time or a reading completion time of the partial image in place of the receiving time from the storage unit 5, and may notify the reading start time or reading completion time to the relative relationship information calculation unit 12.

The partial feature extraction unit 11 extracts feature quantity of a portion of biometric information represented on the partial image every time the partial feature extraction unit 11 receives a partial image from the biometric information acquiring unit 4. Hereinafter, a latest partial image is referred to as "current partial image" for convenience.

The partial feature extraction unit 11 calculates, as the feature quantity, for example, the position of a minutia which is a characteristic fingerprint structure such as ridge endings or bifurcations of a fingerprint. For this purpose, the partial feature extraction unit 11 distinguishes a pixel representing a ridge line and a pixel representing a valley by, for example, binarizing the pixel value of the current partial image. The threshold for binarizing can be set to, for example, the average value of the pixel value of the current partial image. Next, the partial feature extraction unit 11, by thinning pixels having a pixel value corresponding to a ridge line for the binarized current partial image, thins a line in which pixels representing the ridge line are connected so that the thinned line has a width of, for example, 1 pixel. By scanning the current partial image which has been thinned by using a plurality of mask patterns having a binarized pattern corresponding to a ridge ending or bifurcation, the partial feature extraction unit 11 detects a position on the current partial image where any of mask patterns is matched. The partial feature extraction unit 11 sets the centroid pixel of the detected position as a minutia, and the type of the minutia represented by the matched mask pattern (namely, ridge ending or bifurcation) is set to the type of detected minutia.

In the partial feature extraction unit 11, a minutia may be extracted from a current partial image by using a known other method in which ridge endings or bifurcations are extracted as a minutia. Further, the partial feature extraction unit 11 may calculate the average ridge line direction represented on the current partial image as a partial feature. In the partial feature extraction unit 11, in order to calculate the average ridge line direction, any known method in which a ridge line direction is calculated can be utilized. For example, in the partial feature extraction unit 11, the current partial image or the thinned current partial image are transformed into a frequency domain to examine frequency components in a variety of directions and detect the direction in which the frequency component corresponding to the interval of the ridge lines is the highest. Since the direction in which the frequency component corresponding to the interval of the ridge lines is the highest is presumed to be the direction orthogonal to the ridge line, the partial feature extraction unit 11 may set the direction orthogonal to the direction in which the frequency component corresponding to the interval of the ridge lines is the highest to the direction of the ridge line.

The partial feature extraction unit 11 stores the partial feature information including features such as the type of the extracted minutia and the position of the extracted minutia on the current partial image or the ridge line direction, associated with the current partial image into the storage unit 5. The partial feature extraction unit 11 passes the partial feature information to the correlation value calculation unit 13.

The relative relationship information scalculation unit 12 calculates relative position information representing the relative positional relationship between a portion of biometric information represented on the current partial image and a portion of biometric information represented on other partial image which has been received every time a partial image is received from the biometric information acquiring unit 4.

In the present embodiment, the biometric information acquiring unit 4 includes a slide-type sensor, and sequentially generates a plurality of partial images, each of partial images representing a portion of biometric information read by the sensor while a finger moves relative to the sensor. For this reason, a portion of biometric information represented on the current partial image adjoins a portion of biometric information represented on the previous image, namely, the last partial image. The relative relationship information calculation unit 12 therefore reads, for example, the last partial image from the storage unit 5, and performs pattern matching while changing the relative position between the current partial image and the last partial image, to calculate the similarity of both the images such as the cross-correlation value or the L1 norm. The relative relationship information calculation unit 12 calculates the relative positional difference between reference points of two partial images when the similarity thereof is equal to or higher than a predetermined threshold. The relative relationship information calculation unit 12 sets, for example, the positional difference to relative position information. The reference position is set to an arbitrary point on each partial image, for example, the center or any of the corners of the partial image.

The relative relationship information calculation unit 12 may calculate the relative position information by searching on the last partial image a plurality of minutiae having the same positional relationship as the relative positional relationship between a plurality of minutiae extracted from the current partial image. The relative relationship information calculation unit 12 sets the positional difference between a plurality of minutiae having the same positional relationship containing the two partial images to the relative position information.

The relative position information calculation unit 12 calculates relative position information for each position when there exist a plurality of positions where the similarity value is equal to or higher than the threshold for the current partial image. Alternatively, the relative position information calculation unit 12 may calculate the relative position information only for the position where the similarity value is maximum.

Figure 4:
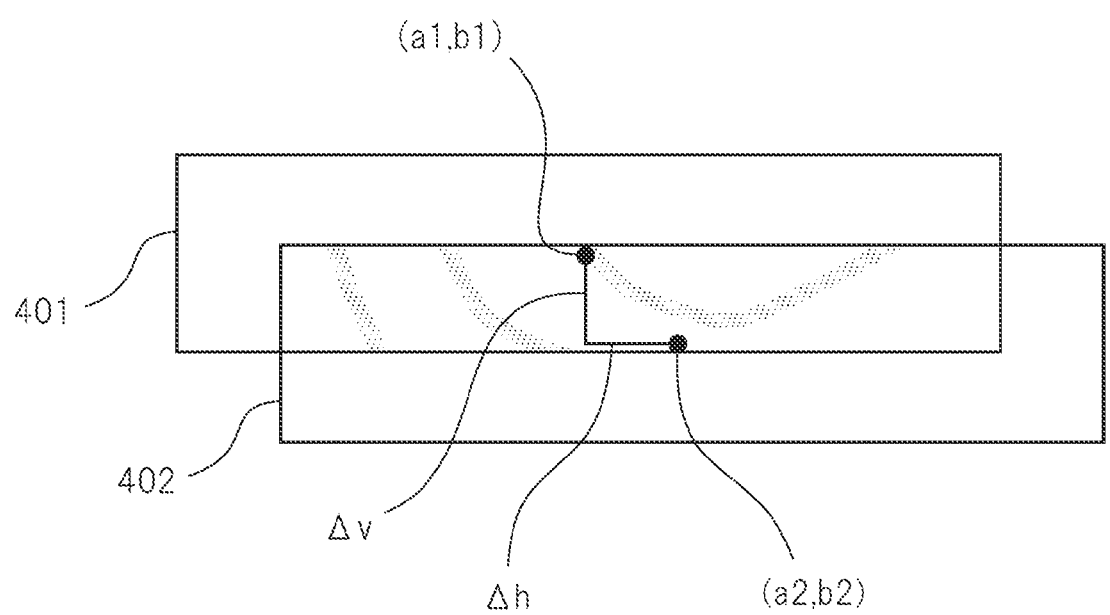
FIG. 4 is a diagram illustrating one example of the relationship between two partial images and relative position information.

FIG. 4 is a diagram illustrating one example of the relationship between two partial images and the relative position information thereof. In FIG. 4, the coordinates of the center of a current partial image 401 which is the reference point is (a1,b1); the coordinates of the center of the last partial image 402 which is the reference point is (a2,b2). Assuming that, for example, an overall biometric information is represented on one biometric image, a1 and a2 are the coordinates in the one biometric image in the horizontal direction. The vertical direction corresponds to the longer direction of the fingerprint; the horizontal direction corresponds to the shorter direction of the fingerprint. b1 and b2 are coordinates of in the biometric image in the vertical direction. As illustrated in FIG. 4, in cases where the similarity between the current partial image 401 and the last partial image 402 is equal to or higher than the threshold when the difference of horizontal coordinates of the centers of the two partial images is Δh and the difference of vertical coordinates of the centers of the two partial images is Δv, the relative position information of the current partial image 401 is (Δh,Δv).

In this case, in order to make it clear the movement direction of a finger, the relative relationship information calculation unit 12 may reverse the sign of the value of the number of pixels in the horizontal direction in cases where the center of the current partial image is left to the center of the last partial image and in cases where the center of the current partial image is right to the center of the last partial image. Further, the relative relationship information calculation unit 12 may reverse the sign of the value of the number of pixels in the vertical direction in cases where the center of the last partial image is higher than the center of the current partial image and in cases where the center of the last partial image is lower than the center of the current partial image. Further, the relative position information may contain the amount of angle deviation of the longer direction of the fingerprint in the current partial image with respect to the longer direction of the fingerprint in the last partial image.

The relative relationship information calculation unit 12 may calculate, as one of relative position informations, the relative movement speed of a finger with respect to the biometric information acquiring unit 4 by dividing the distance between a portion of biometric information represented on the current partial image and the same portion of biometric information represented on the last partial image by the difference between receiving times of two partial images. In order that the movement speed represents the movement direction of a finger, the movement speed has, for example, a positive value when a finger moves from the base toward the fingertip with respect to the biometric information acquiring unit 4, and on the other hand, has a negative value when the finger moves from the fingertip to the base with respect to the biometric information acquiring unit 4. Alternatively, the movement speed may have a negative value when a finger moves from the base toward the fingertip with respect to the biometric information acquiring unit 4, and on the other hand, have a positive value when the finger moves from the fingertip to the base with respect to the biometric information acquiring unit 4. In order to calculate the movement speed, the relative relationship information calculation unit 12 may use, in place of the difference between the receiving times of two partial images, the difference between reading start times of the two partial images or the difference between the reading completion times of the two partial images.

The relative relationship information calculation unit 12 also includes the relative movement speed of a finger in the relative position information. When a plurality of relative position information is calculated for the current partial image, the relative relationship information calculation unit 12 also calculates the movement speed for each relative position information. The relative relationship information calculation unit 12 store the relative position information into the storage unit 5 associated with the current partial image.

The correlation value calculation unit 13 calculates the correlation value between a portion of biometric information represented on the current partial image and registered biometric information specified by user identification information input via the input unit 3 every time the correlation value calculation unit 13 receives a partial image from the biometric information acquiring unit 4. The correlation value calculation unit 13 calculates the correlation value, for example, by minutiae matching. In this case, the correlation value calculation unit 13, for example, aligns any of minutiae contained in the partial feature information of the current partial image with any minutia extracted from the registered biometric image. The correlation value calculation unit 13 calculates the number of other minutiae contained in the partial feature information matched with any of minutiae extract from the registered biometric information. When the distance between two minutiae is equal to or less than, for example, ridge line interval, In the correlation value calculation unit 13 judges that the two minutiae are matched. The correlation value calculation unit 13, only when the types of the two minutiae are matched, may judge that the two minutiae are matched. The correlation value calculation unit 13 calculates the number of minutiae extracted from the current partial image matched with minutiae extracted from the registered biometric image while changing the pair of minutiae to be aligned. The correlation value calculation unit 13 sets the ratio of the number of matched minutiae with respect to the total number of minutiae extracted from the current partial image to the correlation value. If partial feature information contains the direction of ridge line, the correlation value calculation unit 13 may calculate the angle difference between direction of ridge line on the current partial image when alignment was performed corresponding to the calculated number of match, and the direction of the ridge line contained in the corresponding region of a registered biometric image. The correlation value calculation unit 13 may correct the correlation value calculated by the above-mentioned matching number such that when the angle difference becomes larger, the correlation value becomes lower. The direction of the ridge line on a partial region of the registered biometric image is calculated by using the same method as a method in which, for example, the direction of the average ridge line on the partial image is calculated.

Alternatively, the correlation value calculation unit 13 calculates, for each minutia extracted from the current partial image, the Euclidean distance from the closest minutia of the minutiae extracted from the registered biometric image, while changing the pair of minutiae to be aligned. The correlation value calculation unit 13 may calculates the reciprocal of the average value of the Euclidean distance as the correlation value.

Alternatively, the correlation value calculation unit 13 may calculate as the correlation value the reciprocal of the L1 norm or the normalized cross-correlation coefficient by performing pattern matching between the current partial image and the registered biometric image representing the registered biometric information. In this case, the partial feature extraction unit 11 may be omitted. By whichever method the correlation value is calculated, it is preferred that the possible value of the correlation value is in a predetermined range, and that the correlation value is normalized such that the higher the degree of similarity between a portion of biometric information represented on the current partial image and a corresponding portion of the registered biometric information is, the higher the correlation value becomes.

The correlation value calculation unit 13 calculates as a matching candidate position all of the positions on the registered biometric image which overlap the current partial image, for example, a position corresponding to the center of the current partial image when the correlation value for the partial image of focus is equal to or higher than a predetermined threshold. The predetermined threshold can be, for example, the value obtained by multiplying a possible maximum value of a correlation value by 0.7.

Further, the correlation value calculation unit 13 determines a connection candidate to which the matching candidate position belongs. The connection candidate is a set of matching candidate positions for the partial image acquired before the current partial image. The connection candidate is determined such that when a region having the same size as that of the partial image is arranged on the registered biometric image centering on each matching candidate position contained in the connection candidate, a portion of biometric information represented on each region is connected in the original order.

In cases where only one connection candidate exists, and only one matching candidate position calculated for the current partial image exists, the correlation value calculation unit 13 updates the connection candidate such that the matching candidate position is contained in the connection candidate.

However, in some cases, biometric information such as a fingerprint or palmprint contains a plurality of different portions whose local structures are similar to each other. For this reason, there may exist a plurality of positions on the registered biometric image whose correlation value with respect to the current partial image, and as the result, a plurality of matching candidate positions may be detected. In this case, it is difficult for the correlation value calculation unit 13 to specify the position on the registered biometric image actually corresponding to a portion of biometric information represented on the current partial image among a plurality of the detected matching candidate positions based only on the current partial image. Further, when a value obtained by accumulating correlation values calculated for a portion of registered biometric information inherently different from a portion of biometric information represented on each partial image is used for judging that the user is authenticated or not, the authentication accuracy may be compromised. Accordingly, when there exist a plurality of matching candidate positions calculated for the current partial image, the correlation value calculation unit 13 includes each of the matching candidate positions into at least any one of the connection candidates in order that any matching candidate positions are utilized for authentication judgment.

For example, when there exist a plurality of matching candidate positions calculated for the current partial image, the correlation value calculation unit 13 replicates the connection candidate in the number of the matching candidate positions, and for each of the replicated connection candidates, includes any of the plurality of matching candidates for the current partial image. When there exist a plurality of connection candidates, the correlation value calculation unit 13 may include the matching candidate positions calculated for the current partial image into each of the connection candidates. Therefore, for example, when there exist three connection candidates, and two matching candidate positions for the current partial image are calculated, the number of connection candidates is increased to six.

Figure 5:
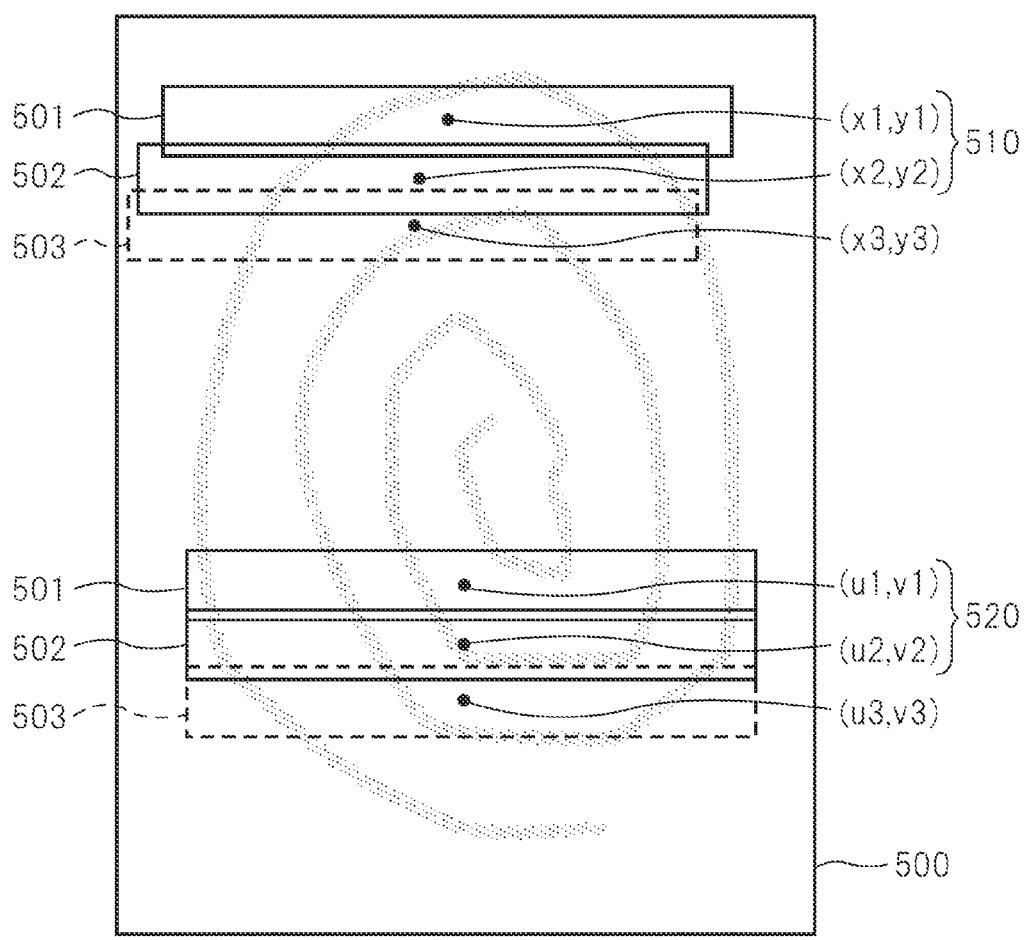
FIG. 5 is a diagram illustrating one example of the relationship between a plurality of partial images and registered biometric images, and connection candidate.

FIG. 5 is a diagram illustrating one example of the relationship between a plurality of partial images and a registered biometric image, and connection candidates. In this example, for one registered biometric image 500, two connection candidates 510, 520 are set. Among these, the connection candidate 510 contains matching candidate positions (x1,y1), (x2, y2) for partial images 501, 502. On the other hand, the connection candidate 520 contains matching candidate positions (u1,v1), (u2,v2) for the same partial images 501, 502.

For example, when one matching candidate position (x3, y3) is detected for a current partial image 503, the correlation value calculation unit 13 includes matching candidate positions (x3,y3) into both of the connection candidate 510 and the connection candidate 520. When two matching candidate positions (x3,y3), (u3,v3) are detected for the current partial image, the correlation value calculation unit 13 replicates the connection candidate 510 into two connection candidates. The correlation value calculation unit 13 includes the matching candidate position (x3,y3) into one connection candidate and includes the matching candidate position (u3,v3) into the other connection candidate. Similarly, the correlation value calculation unit 13 includes the matching candidate position (x3,y3) into one connection candidate obtained by replicating the connection candidate 520, and includes the matching candidate position (u3,v3) into the other connection candidate.

When there exist a plurality of connection candidates, the correlation value calculation unit 13 may select, from among the plurality of connection candidates, the connection candidate to which the matching candidate position for the current partial image belongs. In this case, in order to determine a connection candidate to which the matching candidate position belongs for the current partial image, the correlation value calculation unit 13 may calculate the difference between the matching candidate position calculated for the current partial image and each matching candidate position calculated for the last partial image. The correlation value calculation unit 13 selects from the matching candidate positions of the last partial image, one whose difference to matching candidate position for the current partial image is closest to the positional difference between reference points of the current partial image and the last partial image represented by relative position information. The correlation value calculation unit 13 sets the connection candidate to which the matching candidate position of the selected last partial image belongs as the connection candidate to which the matching candidate position calculated for the current partial image belongs.

An example of a determination method of the connection candidate will be explained with reference to the Table below.

TABLE 1

| Connection candidate | Partial image | Matching candidate position | Difference between matching candidate positions dc | Difference between reference points dr | (dr − dc) | |
|---|---|---|---|---|---|---|
| 510 | 501 | (32, 9) | — | — | | |
|  | 502 | (29, 15) | (−3, 6) | (2, 6) | (5, 0) | |
|  | 503 | (28, 19) | (−1, 4) | (9, 9) | (10, 5) | ○ |
| 520 | 501 | (33, 53) | — | — | | |
|  | 502 | (33, 59) | (0, 6) | (2, 6) | (2, 0) | |
|  | 503 | (28, 19) | (−5, −40) | (9, 9) | (14, 49) | × |

Table 1 lists the positional difference between reference points in each partial image, and the difference between coordinates of one of matching candidate positions calculated for the current partial image 503 and the coordinates of matching candidate position contained in each connection candidate.

Table 1 lists, from left to right, the identification number of a connection candidate, the identification number of a partial image, the matching candidate position for a partial image of each connection candidate, the coordinate difference dc between matching candidate positions between two successive partial images, positional difference dr between reference points, and (dr−dc). Each line of the Table 1 corresponds to one partial image. The coordinates listed on Table 1 are denoted as (horizontal coordinate value, vertical coordinate value) by setting the upper left corner of a registered biometric image to the origin.

The identification numbers of connection candidates and the identification numbers of partial images listed on Table 1 correspond to the reference numerals of the connection candidates and partial images illustrated in FIG. 5, respectively. As listed in Table 1, for example, for a current partial image 503, one matching candidate position (x3,y3) is calculated to be x3=28, y3=19. For the last partial image 502, assuming that there exist two calculated matching candidate positions;

the coordinates of the matching candidate position (x2,y2) which belongs to a connection candidate 510 are (29,15), and the coordinates of a matching candidate position (u2,v2) which belongs to the connection candidate 520 are (33,59). In this case, regarding the connection candidate 510, the difference between the matching candidate position (x3,y3) and the matching candidate position (x2,y2) is (−1,4). On the other hand, regarding connection candidate 520, the difference between the matching candidate position (x3,y3) and the matching candidate position (u2,v2) is (−5,−40).

The difference dr between reference point of the current partial image 503 and the reference point of the last partial image 502 shown in relative position information is (9,9). Consequently, regarding the matching candidate position (x3, y3), (dr−dc) with respect to connection candidates 510, 520 are (10,5), (14,49), respectively. Accordingly, (dr−dc) with respect to the connection candidate 510 is smaller than the (dr−dc) respect to the connection candidate 520. The correlation value calculation unit 13 thus includes the matching candidate position (x3,y3) into the connection candidate 510.

When, with respect to the current partial image, (u3,v3) is calculated as the matching candidate position, the correlation value calculation unit 13 performs the same judgment as above to determine the connection candidate to which the matching candidate position (u3,v3) belongs. For example, when the matching candidate position (u3,v3) is (33,64), for the matching candidate position (u3,v3), (dr−dc) with respect to the connection candidates 510, 520 are (4,−36), (9,4). The correlation value calculation unit 13 thus includes the matching candidate position (u3,V3) into the connection candidate 520.

The dryness state of a finger carrying biometric information and capturing conditions at the time of capturing the current partial image are substantially the same as the dryness state of the finger and capturing conditions at the time of capturing the last partial image. For this reason, when the current partial image and the last partial image contain the same portion of biometric information, the degree of similarity between the current partial image and the last partial image becomes high. For this reason, the accuracy of the relative position information of the current partial image with respect to the last partial image becomes high. Accordingly, as mentioned above, by using the relative position information, the correlation value calculation unit 13 can precisely determine the connection candidate to which the matching candidate position for the current partial image belongs.

Alternatively, the correlation value calculation unit 13 may limit, for each connection candidate, a search region on the registered biometric image on which the correlation value is calculated based on the relative position information for the current partial image and matching candidate position for the last partial image. In this case, the correlation value calculation unit 13 reads relative position information concerning the current partial image and each matching candidate position for the last partial image from the storage unit 5. The correlation value calculation unit 13 set as a search region, a region which has an area which is a predetermined times (for example, one to three times) the area of a partial image and has a center on the point which is obtained by adding the relative positional difference contained in the relative position information of the current partial image to each matching candidate position for the last partial image. When the maximum value of the correlation values in the search region is equal to or higher than the threshold with respect to the correlation value, the correlation value calculation unit 13 sets the position in the search region corresponding to the maximum correlation value to the matching candidate position of the current partial image which belongs to the connection candidate corresponding to the search region.

The correlation value calculation unit 13 stores the relative position information, the matching candidate position and the corresponding correlation value with respect to the current partial image into the storage unit 5 associated with the connection candidate to which the matching candidate position belongs.

The similarity update unit 14 updates, for each connection candidate, the partial similarities representing the similarities between portions of biometric information represented on all partial images which have been acquired and the registered biometric information, by using the correlation value for the current partial image. At that time, preferably, the more constant the distance between portions of biometric information represented on each of two successive partial images included in the all partial images which have been acquired is, the higher the similarity update unit 14 sets the partial similarity. In other words, preferably, the smaller the difference between the relative positional relationship between each pair of two successive partial images is, the higher the similarity update unit 14 sets the partial similarity. The more constant the distance is, the smaller the distortion of a biometric information represented on an image obtained by composing each partial image, as a result, the more precisely the partial similarity represents the degree of similarity with respect to the registered biometric information.

The similarity update unit 14 reads the correlation value and relative position information of each partial image for each connection candidate from the storage unit 5. The similarity update unit 14 updates the partial similarity for each connection candidate according to, for example, the following equations:

$$S_n = (1/n)\left\{R_1 + \sum_{i=2}^{n} R_i \cdot k_i\right\} \quad (1)$$

$$k_i = \begin{cases} 1 & \text{sign}(V_i) = \text{sign}(V_{i-1}) \\ 0 & \text{sign}(V_i) \neq \text{sign}(V_{i-1}) \end{cases}$$

where $S_n$ is the partial similarity when the current partial image is nth (n is an integer equal to 1 or larger) partial image. $R_i$ is a correlation value calculated for the ith ($1 \leq i \leq n$) partial image. $V_i$ is a movement speed calculated for the i-th partial image. Since, for the initial partial image, the movement speed is not calculated, it is possible that $k_2=1$. The function sign(x) is a function which outputs '1' when the sign of variable x is positive and outputs '−1' when the sign of variable X is negative. For example, when a finger moves in the vertical direction with respect to the biometric information acquiring unit 4, the sign of movement speed $V_i$ may be determined by the coordinate difference between the reference points of two successive partial images in the vertical direction. As the partial similarity $S_n$ becomes higher, the portions of biometric information represented on n partial images are more similar to the registered biometric information. According to the equation (1), when the signs of the movement speeds of the finger calculated for two successive partial images are opposite to each other, i.e., the movement directions are opposite to each other, the coefficient $k_i$ is 0; and therefore, as each partial image is generated while the finger moves along in a constant direction, the partial similarity becomes higher.

In the following, an example of calculation of the partial similarity will be explained with reference to Table 2 listing the relative position information for each partial image, the correlation value and the partial similarity at the time of acquiring each partial image.

TABLE 2

| capturing order | partial image | reference point | difference between reference points dr | difference between acquiring times (msec) | movement speed (pixel/msec) | correlation value | partial similarity |
|---|---|---|---|---|---|---|---|
| 1 | 501 | (36, 6) | — | — | — | 0.6 | 0.6 |
| 2 | 502 | (38, 12) | (2, 6) | 10 | 0.63 | 0.7 | 0.65 |
| 3 | 503 | (47, 21) | (9, 9) | 10 | 12.73 | 0.7 | 0.67 |
| 4 | 504 | (47, 19) | (0, −2) | 10 | −0.14 | 0.65 | 0.5 |

For one connection candidate, Table 2 lists, from left to right, the capturing order of partial images, the identification number of a partial image, a reference point, the positional difference dr between reference points, the difference of acquiring times between two successive partial images, the movement speed, the correlation value of each partial image and the partial similarity at the time of acquiring each partial image. Each line of Table 2 corresponds to one partial image. The coordinates listed on Table 2 are denoted by (horizontal coordinate value, vertical coordinate value) when, assuming overall biometric information captured by the biometric information acquiring unit 4 is represented on one biometric image, the upper left corner of the biometric image is set to the origin. In this example, the movement direction calculated for the latest partial image (namely, current partial image) 504 is opposite to the movement direction calculated for the previous partial images. For this reason, the sign of movement speed of the partial image 504 is negative. As the result, for partial images 501 to 503, the partial similarity calculated according to the equation (1) is the simple average value of the correlation values of all partial images previously acquired. However, because the correlation value of the partial image 504 is not added, the partial similarity at the time of acquiring the partial image 504 is a value obtained by dividing the total sum of the correlation values of the partial images 501 to 503 by the number of the partial images 4 at the time of acquiring the partial image 504. As mentioned above, when the movement direction reverses, the partial similarity becomes small.

In cases where the relative positional relationship calculated for two successive partial images with respect to the biometric information acquiring unit 4 is erroneous or cases where a user does not appropriately move a finger, the movement speed calculated for each partial image becomes unstable. In such a case, the partial similarity may not precisely represent the degree of similarity between a portion of biometric information represented on each partial image and the registered biometric information. The similarity update unit 14 may therefore update the partial similarity such that the larger the difference between the movement speeds of the finger of two successive partial images, the smaller value the partial similarity S, becomes, according to the following equations in place of the equation (1):

$$S_n = (1/n)\left\{R_1 + \sum_{i=2}^{n} \{R_i \cdot (1 - k_i)\}\right\} \quad (2)$$

where $k_i = c|(V_i - V_{i-1})/V_i|$ if $\{V_i \neq 0, 0 < c < 1\}$ $k_i = 0$ else if $\{V_i = 0\}$.

When the detection error of the relative positional difference between the reference points is small, the similarity update unit 13 may make the value of the partial similarity not to be affected by the detection error. In this case, for example, the value of $k_i$ in the equation (2) is set to the following based on the acceptable error $\epsilon$:

$k_i = c|(V_i - V_{i-1})/V_i|$ if $\{c(V_i - V_{i-1})/V_i| \geq \epsilon\}$ $k_i = 0$ else if $\{c|(V_i - V_{i-1})/V_i| < \epsilon\}$ The acceptable error $\epsilon$ is optimized, for example, experimentally.

When the movement speed of the finger with respect to two successive partial images is unstable, the distance between reference points of the two partial images is unstable. For this reason, the similarity update unit 14 may use the distance between the reference points of two successive partial images in place of movement speed $V_i$, $V_{i-1}$, in the equation (2).

Further, the larger the number of partial images, the larger information the biometric authentication can utilize. Therefore, the similarity update unit 14 may update the partial similarity such that the larger the number of partial images, the higher the partial similarity becomes. For example, the similarity update unit 14 may multiple the partial similarity calculated according to the equation (1) or (2) by a corrective coefficient such as ((n/N+4)/5). N is the number of partial images which is needed for capturing an overall biometric information, and, for example, calculated by the ratio of the area of assumed overall biometric information with respect to the area of a sensor which the biometric information acquiring unit 4 includes. The similarity update unit 14 stores the partial similarity into the storage unit 5 associated with the corresponding connection candidate.

The authentication judging unit 15 judges whether a user is authenticated as a registered user or not by comparing the partial similarity with an authentication judging threshold. For example, when the partial similarity is equal to or higher than the authentication judgment value, the authentication judging unit 15 judges that a portion of biometric information represented on each partial image and the registered biometric information specified by user identification information input via the input unit 3 are matched with each other. The authentication judging unit 15 authenticates the user as the registered user having the registered biometric information. After the authentication judging unit 15 authenticates the user, the authentication judging unit 15 notifies the authentication result to the processing unit 6. The processing unit 6 permits the authenticated user to utilize a device on which the biometric authentication device 1 is mounted or a device to which the biometric authentication device 1 is connected.

The authentication judging unit 15 calculates the maximum value of the partial similarity for each connection candidate when there exist a plurality of connection candidates. The authentication judging unit 15 compares the maximum value of the partial similarity with the authentication judging threshold and may authenticate the user when the maximum value of the partial similarity is equal to or higher than the authentication judging threshold.

On the other hand, when the maximum value of the partial similarity is lower than the authentication judging threshold, the authentication judging unit 15 notifies the processing unit 6 that the maximum value of the partial similarity is lower than the authentication judging threshold. The processing unit 6 does not authenticate a user when, in the authentication judging unit 15, the partial similarity is lower than the authentication judging threshold, even when all partial images are acquired and every portion of the biometric information is represented on any partial image. In this case, the processing unit 6 denies the user who is not authenticated from using a device on which the biometric authentication device 1 is mounted or a device to which the biometric authentication device 1 is connected. The processing unit 6 may display a message indicating that the authentication has been failed on the display unit 2. Whether all partial images are acquired or not may be judged, for example, by whether the number of generated partial images reaches a predetermined number or not, or whether a predetermined time has passed from the receiving time of the initial partial image or not. Further, the processing unit 6 may judge that all partial images are acquired when the sum of the distances in the longer direction of the fingerprint between portions of biometric information represented on the two successive partial images from the initially acquired partial image to the latest partial image reaches the assumed value of the distance of the overall fingerprint along the longer direction. When all partial images are not acquired, the processing unit 6 makes the image loading unit 10 load the next partial image of the current partial image from the storage unit 5.

Preferably, the authentication judging threshold is set to a value such that the authentication judging unit 15 successfully authenticate a user only when a registered user himself/herself is a user. The authentication judging threshold is preferably set to a value such that when a person different from the registered user is a user, the authentication judging unit 15 fails in authentication. For example, the authentication judging threshold may be a value obtained by adding a value obtained by multiplying the difference between a possible maximum value of the partial similarity and the minimum value by 0.7 to the minimum value of the partial similarity.

When a user is not authenticated for the current partial image, the selecting unit 16 selects, from among the then survived all connection candidates, a connection candidate in which the partial similarity is continued to be updated for the next partial images. When the number of connection candidates is small, the operational load of the processing unit 6 becomes small even when the processing unit 6 continues updating, for all of the connection candidates, the partial similarity every time a new partial image is acquired. However, as mentioned regarding the correlation value calculation unit 13, a plurality of matching candidate positions may be detected for each partial image. For this reason, when all connection candidates are stored as they are, as the acquired partial images are increased, the number of connection candidates may be increased. As the number of the connection candidates increases, the operational load of the processing unit 6 increases.

Accordingly, in order to reduce the operational load of the processing unit 6, the selecting unit 16 deletes a connection candidate which is judged that a portion of biometric information represented on a partial image obtained by arranging each partial image corresponding to each matching candidate position contained in the connection candidate is not matched with any portion of the registered biometric information.

For example, it is likely that a matching candidate position belonging to a connection candidate having a small partial similarity represents a portion on the registered biometric information different from a portion of biometric information represented on each partial image even though the user is the registered user himself/herself. Accordingly, the selecting unit 16 compares the partial similarity for each connection candidate with a tracking stopping threshold. The selecting unit 16 stops tracking of a connection candidate whose partial similarity is lower than the tracking stopping threshold. The tracking stopping threshold is lower than the authentication judging threshold, and for example, may be set to the average value of the possible maximum value and the minimum value of the partial similarity. The tracking stopping threshold may be set such that as the number of the acquired partial images is increased, the tracking stopping threshold becomes higher.

Further, the selecting unit 16 judges, for each connection candidate, whether the movement of a finger represented by the matching candidate position contained in the connection candidate is inappropriate or not, and when the movement is inappropriate, the selecting unit 16 may stop tracking of the connection candidate.

In general, a user moves a finger linearly with respect to the biometric information acquiring unit 4, along the longer direction of the fingerprint. For this reason, the distance between matching candidate positions corresponding to successive partial images in the shorter direction of the fingerprint becomes relatively a small value. The selecting unit 16 calculates, for each connection candidate, the sum of the absolute values of the distance between matching candidate positions with respect to two successive partial images in the shorter direction of the fingerprint. When the sum of the absolute values of the distances is larger than a predetermined distance threshold, the selecting unit 16 stops tracking of the connection candidate corresponding to the sum of the absolute value of the distance. The predetermined distance threshold may be set to, for example, the number of pixels corresponding to $1/10$ to $1/5$ of the size of the fingerprint in the shorter direction thereof.

Alternatively, the selecting unit 16 may stop tracking of the connection candidate in which the conditions of the following inequation are satisfied:

$$\sum_{i}^{n} (V_i \cdot t_i) > L_{thi} \tag{3}$$

where $V_i$ is the movement speed calculated for the ith partial image, and $t_i$ is the difference between the receiving time of the ith partial image and the receiving time of the (i−1)th partial image. Therefore, the left-hand term of the inequation (3) is equal to the sum of the distance between the reference points of two successive partial images. $L_{thi}$ is a threshold with respect to the distance, which is, for example, set to the sum of the heights of i partial images in the vertical direction. In this case, when the condition of the inequation (3) is satisfied, a portion of biometric information is not represented on any of the partial images.

Alternatively, the selecting unit 16 may stop tracking of the connection candidate in which the conditions of the following inequation are satisfied:

$$\sum_{j=1}^{m} t_j > T_{th} \tag{4}$$

where, $t_j$ is the difference between the receiving time of jth partial image and the receiving time of (j−1)th partial image, letting the partial image whose movement speed first becomes 0 be the first partial image. represents the total number of partial images whose movement speed is '0' or substantially '0'. $T_{th}$ is a stopping time threshold, and set to, for example, several times the acquisition interval of a partial image in the biometric information acquiring unit 4. When the movement speed of a partial image acquired after the movement speed for a certain partial image becomes 0 becomes a value other than 0, the selecting unit 16 may reset the value the left term of the inequation (4) to '0'.

Further, the selecting unit 16 may calculate for two successive partial images the total number of the sign change between sign ($V_i$) and sign ($V_{i-1}$), and stop tracking of the connection candidate when the total number is equal to or higher than the predetermined threshold number. In other words, when the number of reverse of the movement direction is equal to or larger than the predetermined threshold number, tracking of the connection candidate is stopped. The predetermined threshold number is a positive integer, and for example, set to one or two.

Still alternatively, the selecting unit 16 may stop tracking of the connection candidate in which the conditions of the following inequation are satisfied:

$$\sum_{i=1}^{m} \{(V_i \cdot V_{i-1})/|V_i| \cdot |V_{i-1}|\} < I_{th} \qquad (5)$$

where $V_i$ is the movement speed calculated for the ith partial image. Therefore, the left-hand term of the inequation (5) is a value obtained by subtracting the number of movements of a finger in a reversed direction from the number movements of a finger in the same direction. The threshold $I_{th}$ is set to, for example, '0' or '−1'.

The reason why a value which is independent on the magnitude of the movement speed such as the left-hand term of the inequation (5) is used is so that, even when a phenomenon of an abrupt change in movement speed occurs intermittently due to the friction between a finger and the biometric information acquiring unit 4, judgment of stopping of tracking is not affected by the phenomenon. The phenomenon is referred to as "stiction". When stiction occurs, skin of a finger is caught on a sensor surface and the movement speed momentarily becomes '0'. However, since the finger itself moves at a certain speed, the movement direction of the finger is not reversed. For this reason, by using the inequation (5), the selecting unit 16 can appropriately judge without being affected by stiction whether the tracking is stopped or not.

Figure 6:
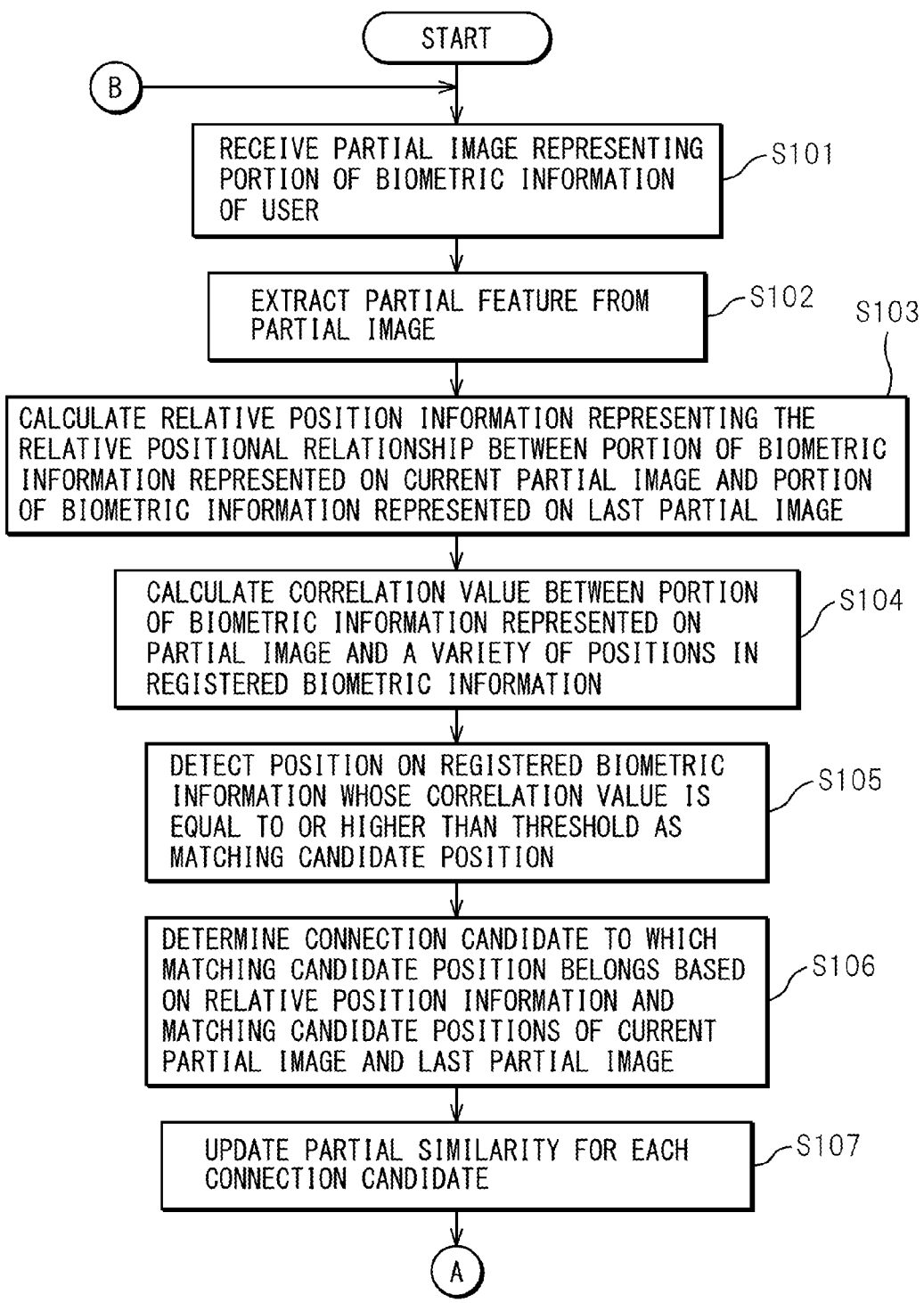
FIG. 6 is a diagram illustrating an operation flowchart of biometric authentication process controlled by a computer program executed on a processing unit.
Figure 7:
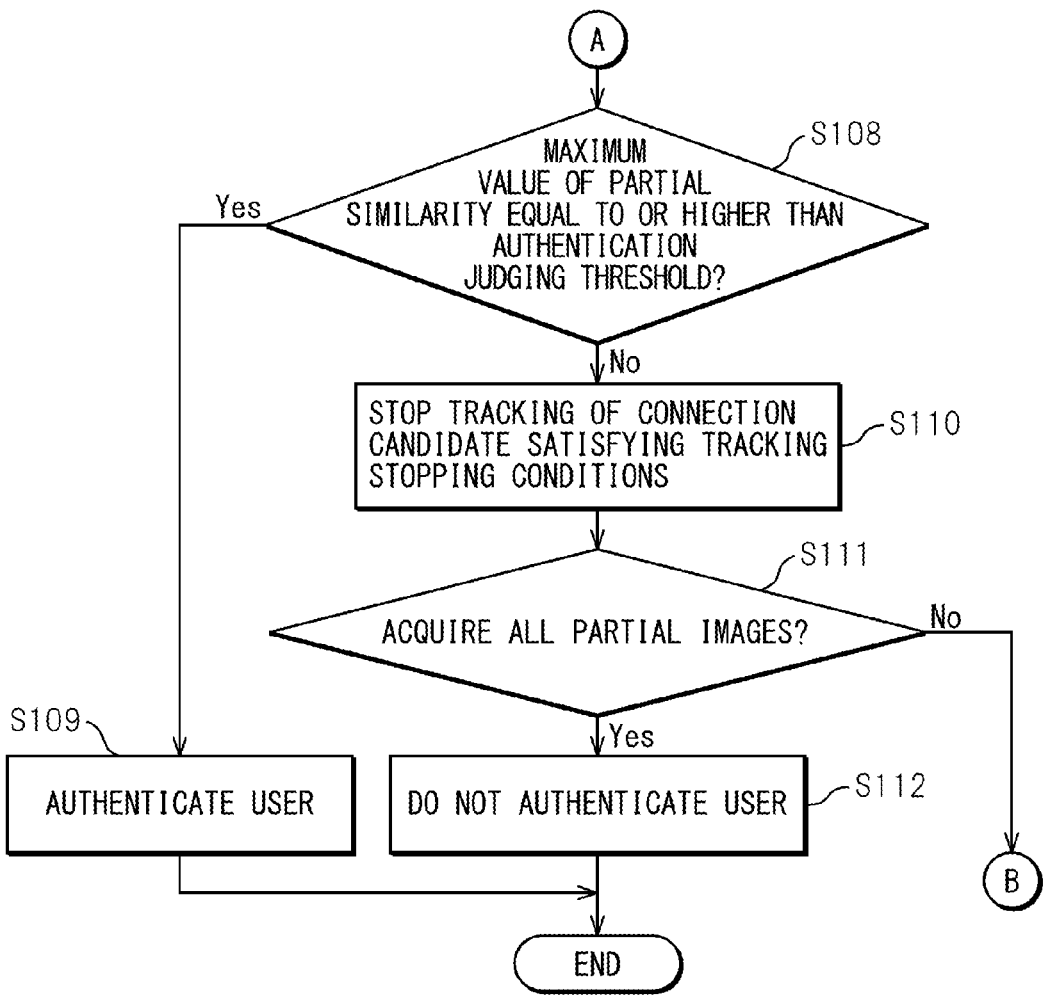
FIG. 7 is a diagram illustrating an operation flowchart of a biometric authentication process controlled by a computer program executed on a processing unit.

FIG. 6 and FIG. 7 are diagrams illustrating an operation flowchart of biometric authentication process controlled by a computer program executed on the processing unit 6.

As illustrated in FIG. 6, the processing unit 6 receives a partial image representing a portion of biometric information of a user from the biometric information acquiring unit 4 (step S101). The processing unit 6 stores the current partial image which is the latest partial image into the storage unit 5. The image loading unit 10 of the processing unit 6 loads the current partial image from the storage unit 5, and passes the current partial image to the partial feature extraction unit 11 of the processing unit 6 and the relative relationship information calculation unit 12. The partial feature extraction unit 11 extracts the feature quantity of a portion of biometric information represented on the current partial image (step S102). The partial feature extraction unit 11 stores partial feature information including the feature quantity into the storage unit 5 associated with the current partial image. The relative relationship information calculation unit 12 calculates the relative position information representing the relative positional relationship between a portion of biometric information represented on the current partial image and a portion of biometric information represented on the last partial image (step S103). The relative relationship information calculation unit 12 stores the relative position information into the storage unit 5 associated with the current partial image.

The correlation value calculation unit 13 of the processing unit 6 reads data concerning registered biometric information specified by user identification information input via the input unit 3 from the storage unit 5. The correlation value calculation unit 13 calculates the correlation value between a portion of biometric information represented on the current partial image and a variety of position of the registered biometric information based on the partial feature information (step S104). The correlation value calculation unit 13 compares the correlation value at each position with a predetermined threshold, and detects a position on registered biometric information whose correlation value is equal to or higher than the predetermined threshold as a matching candidate position (step S105). Further, the correlation value calculation unit 13 determines a connection candidate to which matching candidate position calculated from the current partial image belongs (step S106). When a plurality of matching candidates are detected, the correlation value calculation unit 13 performs a process of step S106 for each matching candidate. The correlation value calculation unit 13 stores relative position information, matching candidate position and correlation value at the matching candidate position regarding the current partial image into the storage unit 5 associated with a connection candidate which the matching candidate position belongs to.

Subsequently, a partial similarity update unit 14 of the processing unit 6 updates the partial similarity for each connection candidate which is stored in the storage unit 5 (step S107). The partial similarity update unit 14 rewrites for each connection candidate the value of partial similarity stored in the storage unit 5 by an updated partial similarity.

As illustrated in FIG. 7, the authentication judging unit 15 of the processing unit 6 reads the partial similarity of each connection candidate from the storage unit 5, and calculates the maximum value of the partial similarity. The authentication judging unit 15 judges whether the maximum value of the partial similarity is equal to or higher than the authentication judging threshold or not (step S108).

When the maximum value of the partial similarity is equal to or higher than the authentication judging threshold (step S108—Yes), the authentication judging unit 15 authenticates the user as a registered user specified by user identification information input via the input unit 3 (step S109).

On the other hand, when the maximum value of the partial similarity is lower than the authentication judging threshold (step S108—No), the authentication judging unit 15 notifies that the user is not authenticated at that time to the processing unit 6. The selecting unit 16 of the processing unit 6 judges whether the predetermined tracking stopping condition is satisfied or not for each connection candidate stored in the storage unit 5, and stops tracking of the connection candidate which satisfies the tracking stopping condition (step S110). The selecting unit 16 deletes from the storage unit 5 information concerning the connection candidate for which tracking is stopped.

Subsequently, the processing unit 6 judges whether all partial images are acquired or not (step S111). When any of partial images is not acquired (step S111—No), the processing unit 6 repeats the processes of the step S101 and subsequent steps. On the other hand, when all partial image are acquired (step S11—Yes), the processing unit 6 does not authenticate the user (step S112).

After the step S109 or S112, the processing unit 6 completes the biometric authentication process. The processing unit 6 may perform the process of step S103 in parallel with the process of step S102 and step S104. Alternatively, the processing unit 6 may perform the process of the step S103 before the step S102 or after the step S104. In the step S104, when the processing unit 6 calculates the correlation value by pattern matching of a partial image and a registered biometric image, the step S102 may be omitted.

As explained above, even though a portion of biometric information is not captured, the biometric authentication device according to the embodiment can judge whether a user can be authenticated or not based on the acquired portion of biometric information. For this reason, the biometric authentication device can reduce the operational load of a processing unit, as well as, a user can be authenticated in a short time. The biometric authentication device calculates the partial similarity taking into account the relative positional relationship between portions of biometric information represented on a plurality of partial images. For this reason, the biometric authentication device can more precisely calculate the degree of similarity between biometric information of a user and registered biometric information than the case where the degree of similarity between a portion of biometric information represented on the partial image and registered biometric information for each individual partial image is utilized, thereby improving the authentication accuracy.

Next, a biometric authentication device according to the second embodiment will be explained. The biometric authentication device according to the second embodiment, in cases where a user can not be authenticated even when the above-mentioned matching process is performed for all partial images corresponding to the overall biometric information of a target body part, generates one composite image representing overall biometric information by using each partial image. The biometric authentication device performs matching process by using the composite image.

The biometric authentication device according to the second embodiment is similar to the biometric authentication device according to the first embodiment except only for a part of a function concerning the biometric authentication process of the processing unit. Accordingly, in the following, among the functions of the processing unit of the biometric authentication device according to the second embodiment, the point which is different from the functions of the processing unit of the biometric authentication device according to the first embodiment will be explained.

Figure 8:
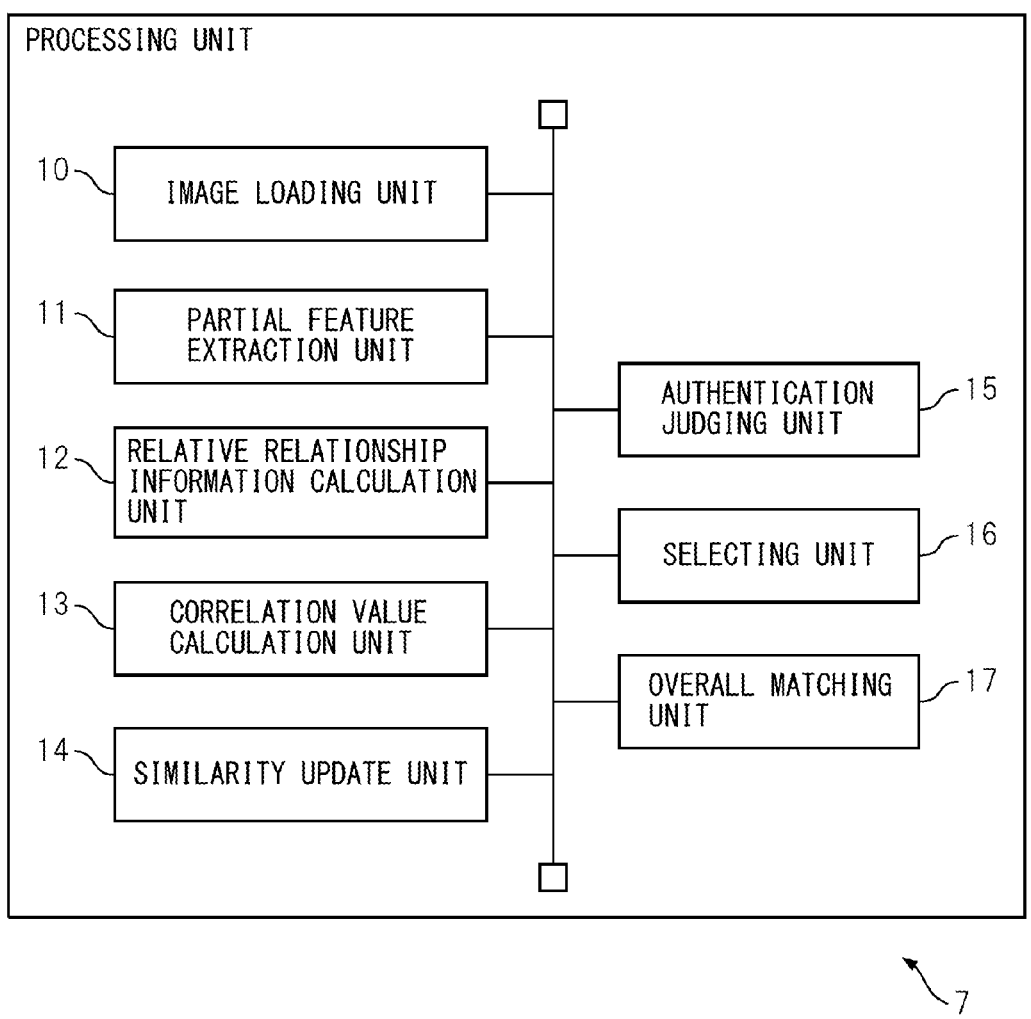
FIG. 8 is a functional block diagram of a processing unit of a biometric authentication device according to a second embodiment.

FIG. 8 is a functional block diagram of a processing unit included in a biometric authentication device according to the second embodiment. As illustrated in FIG. 8, a processing unit 7 includes an image loading unit 10, a partial feature extraction unit 11, a relative relationship information calculation unit 12, a correlation value calculation unit 13, a similarity update unit 14, an authentication judging unit 15, a selecting unit 16, and an overall matching unit 17. In FIG. 8, to each functional block of the processing unit 7, the same reference numeral as that of the corresponding functional block in the processing unit 6 illustrated in FIG. 3 was provided.

For each surviving connection candidate, the overall matching unit 17 generates a composite image by compositing individual partial images such that portions which match between adjoining partial images overlap each other based on the relative position information of each partial image. The overall matching unit 17 matches overall biometric information represented on a composite image and a registered biometric information.

For example, the overall matching unit 17 extracts overall features, which is the feature of biometric information over a plurality of partial images, from the composite image. For example, the overall matching unit 17, as disclosed in Japanese Laid-open Patent Publication No. 2001-118065, can calculate, regarding a minutia of focus, for the information indicating the relationships between ridge line positions on which minutiae therearound exist and the ridge line position on which the minutia of focus exists. Alternatively, the overall matching unit 17, as disclosed in Japanese Laid-open Patent Publication No. 11-195119, may extract information representing how each minutia is connected via a ridge line as an overall feature quantity.

Further, the overall matching unit 17 may extract, for each minutia, the number of ridge lines existing between the minutia and the minutia therearound closest thereto as the overall features. Further, the overall matching unit 17 may also extract the position of a singular point of a fingerprint such as a delta or a vortex core as the overall features. Such a singular point is detected by, for example, template matching in the same manner as, for example, the detection of ridge endings or bifurcations.

When the relationship between the ridge line positions of minutiae is calculated, the overall matching unit 17 judges whether minutiae on the composite image and minutiae on the registered biometric image are matched with each other or not, for example, based on the relationship between ridge line positions as described in Japanese Laid-open Patent Publication No. 2001-118065. When the connection relationship of ridge lines between minutiae is calculated, the overall matching unit 17 judges whether minutiae on the composite image and minutiae on the registered biometric image are matched with each other or not, for example, as described in Japanese Laid-open Patent Publication No. Hei 11-195119, based on the connection relationship. The overall matching unit 17 calculates the ratio of the number of matched minutiae with respect to the total number of minutiae on the composite image as the overall similarity.

The overall matching unit 17 may, for each matched minutia, calculate the number of ridge lines for the composite image between the matched minutia and the closest other matched minutia and the number of ridge lines for the registered biometric image between the matched minutia and the closest other matched minutia, and calculate the difference between the number of ridge lines for the composite image and the number of ridge lines for the registered biometric image. The overall matching unit 17 sets, for each matched minutia, a matching coefficient whose value is the larger as the difference of the numbers of the ridge lines is the smaller. The matching coefficient is set to '1' when, for example, the number of the ridge lines for the composite image is equal to the number of the ridge lines for the registered biometric image; and is set to '0' when the difference between the number of ridge lines for the composite image and the number of ridge lines for the registered biometric image is not less than a predetermined number (for example, three). The overall matching unit 17 calculates the sum of the matching coefficients while changing the pair of minutiae to be aligned. The overall matching unit 17 calculates the ratio of the sum of the matching coefficient with respect to the total number of minutiae extracted from the composite image or the registered biometric image as an overall similarity.

Further, the overall matching unit 17 may match biometric information represented on the composite image and the registered biometric information by using another matching method utilizing a feature quantity acquired from the overall biometric information. For example, the overall matching unit 17 may match the biometric information represented on the composite image and the registered biometric information by using a phase limited correlation method to calculate the correlation value as the overall similarity.

When the overall similarity is equal to or higher than the authentication judging threshold, the overall matching unit 17 judges that the biometric information and the registered biometric information on the composite image are matched and authenticates the user. On the other hand, when the overall similarity is lower than the authentication judging threshold, the overall matching unit 17 judges that the biometric information and the registered biometric information on the composite image are not matched with each other, and does not authenticate the user. The authentication judging threshold with respect to the overall similarity may be the same as or different from the authentication judging threshold used for comparing the partial similarity.

When there exist a plurality of surviving connection candidates, the overall matching unit 17 calculates the overall similarity for each connection candidate. When the maximum value of the overall similarity is equal to or higher than an authentication judging threshold, the overall matching unit 17 judges that the biometric information on the composite image and the registered biometric information are matched; on the other hand, when the maximum value of the overall similarity is lower than the authentication judging threshold, the overall matching unit 17 judges that the biometric information on the composite image and the registered biometric information are not matched.

Figure 9:
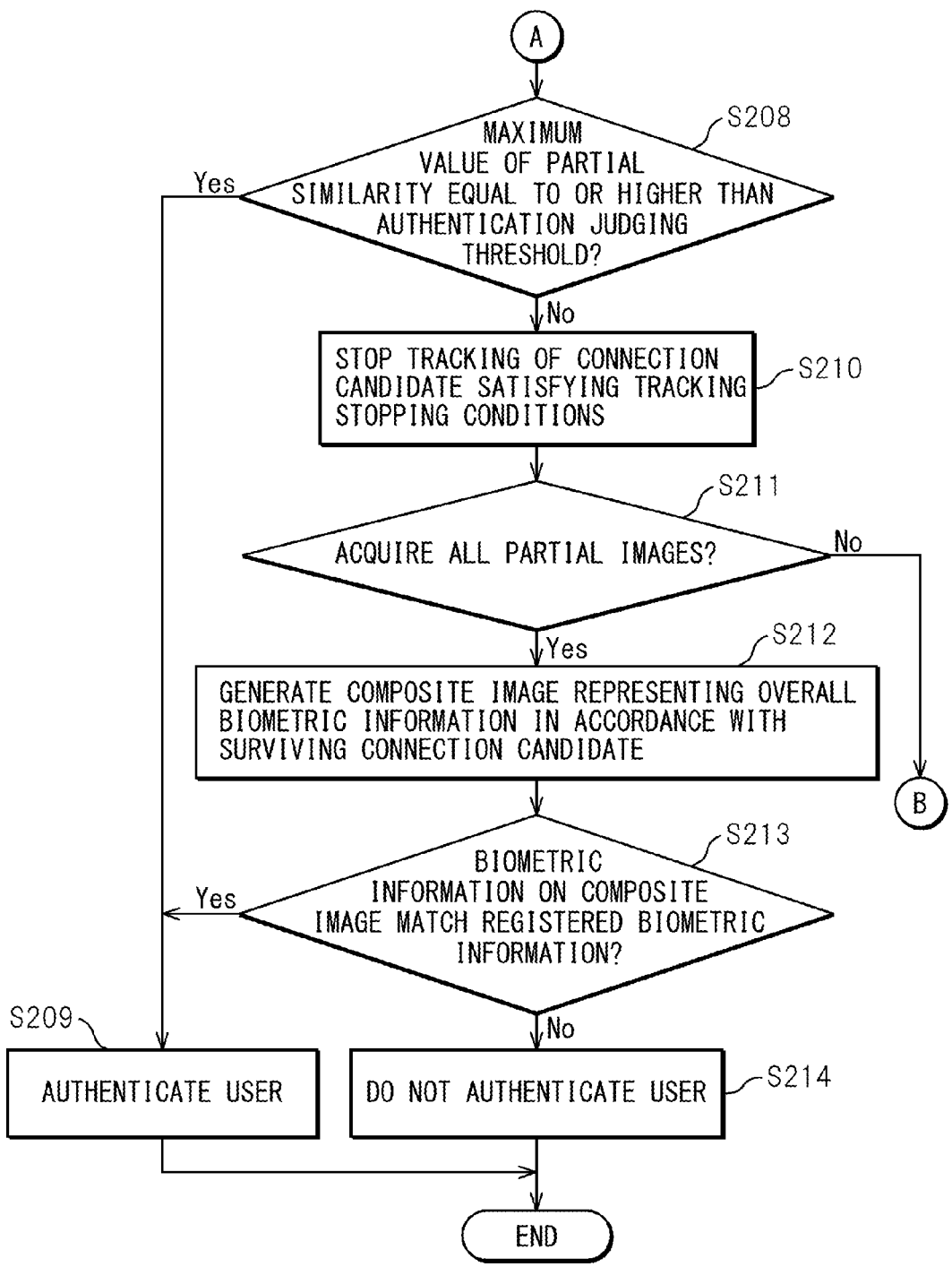
FIG. 9 is a diagram illustrating an operation flowchart of a biometric authentication process controlled by a computer program executed on a processing unit according to a second embodiment.

FIG. 9 is a diagram illustrating an operation flowchart of a biometric authentication process controlled by a computer program performed on the processing unit according to the second embodiment. The biometric authentication process according to the embodiment, the processing unit 7 performs processes of steps S101 to S107 of a biometric authentication process according to the first embodiment illustrated in FIG. 6. The processing unit 7 performs processes of steps S208 to S214 illustrated in FIG. 9 after the step S107 in place of processes of steps S108 to S112 illustrated in FIG. 7.

As illustrated in FIG. 9, the authentication judging unit 15 of the processing unit 7 reads the partial similarity of each connection candidate from the storage unit 5, and calculates the maximum value of the partial similarity. The authentication judging unit 15 judges whether the maximum value of the partial similarities is equal to or higher than the authentication judging threshold or not (step S208).

When the maximum value of the partial similarities is equal to or higher than the authentication judging threshold (step S208—Yes), the authentication judging unit 15 authenticates the user as a registered user specified by user identification information input via the input unit 3 (step S209).

On the other hand, when the maximum value of the partial similarities is lower than the authentication judging threshold (step S208—No), the authentication judging unit 15 notifies that the user is not authenticated at that time to the processing unit 7. The selecting unit 16 of the processing unit 7 judges whether the predetermined tracking stopping conditions are satisfied or not for each connection candidate stored in the storage unit 5, and stops tracking of the connection candidate which satisfies the tracking stopping conditions (step S210). The selecting unit 16 deletes from the storage unit 5 information concerning the connection candidate for which tracking is stopped.

Subsequently, the processing unit 7 judges whether all partial images are acquired or not (step S211). When any of partial images is not acquired (step S211—No), the processing unit 7 repeats the processes of the step S101 and subsequent steps. On the other hand, when all partial images are acquired (step S211—Yes), the overall matching unit 17 of the processing unit 7 generates a composite image representing the overall biometric information according to surviving connection candidates (step S212). The overall matching unit 17 judges whether the biometric information and the registered biometric information on the composite image are matched with each other or not (step S213). When the biometric information and the registered biometric information on the composite image are matched with each other (step S213—Yes), the processing unit 7 authenticates the user (step S209). On the other hand, the biometric information and the registered biometric information on the composite image are not matched (step S213—No), the processing unit 7 does not authenticate the user (step S214). After the step S209 or S214, the processing unit 7 completes the biometric authentication process.

According to the embodiment, even when the biometric authentication device can not judge whether the user is a registered user or not by a matching process based on a portion of biometric information, the biometric authentication device perform a matching process again by using the features of biometric information acquired by referring to a relatively wide range of the image. For this reason, the biometric authentication device according to the second embodiment can more precisely match the biometric information of a user with the registered biometric information, thereby reducing the false rejection rate compared with the biometric authentication device according to the first embodiment.

The present invention is not restricted to the above-mentioned embodiments. For example, the biometric information acquiring unit may have a mechanism in which a user fixes a finger at a fixed position, and a sensor which the biometric information acquiring unit includes moves to scan the finger. In such a case, the finger moves relatively with respect to the biometric information acquiring unit at nearly a constant speed and along a specified direction. Accordingly, the relative relationship information calculation unit may calculate the relative positional relationship between portions of biometric information represented on a partial image of focus and the previous partial image such that they are apart from each other by a distance obtained by multiplying the speed by the difference between the receiving times of two partial images along the specified direction.

The biometric information acquiring unit may include an area sensor by which one biometric image capturing biometric information of a target body part can be acquired. In this case, the processing unit divide the biometric image into a plurality of partial images. In this example, since the relative positional relationship between partial images is known in advance, the relative information calculation unit of the processing unit determines relative position information for a partial image of focus based on the relative positional relationship. In this case, the partial similarity update unit of the processing unit sets the movement speed for each partial image to the positive same value, for example, '1', and calculates the equation (1) or (2) to update the partial similarity. The processing unit deals two partial images adjoined in a predetermined order as successive partial images. The predetermined order may be, for example, the order of raster scanning.

The relative position information may be calculated based on the matching candidate position on the registered biometric information calculated by the correlation value calculation unit. In this case, the relative position information of the current partial image is set for each matching candidate position calculated from the current partial image. For example, the difference between the matching candidate position of focus with respect to the current partial image and the closest position among matching candidate positions acquired with respect to the last partial image is the relative position information with respect to the matching candidate position of focus. In this case, when there exist a plurality of connection candidates, the relative position information between two successive partial images may vary for each connection candidate. Therefore, the difference between movement speeds of two successive partial images at the time of calculating the partial similarity may vary for each connection candidate.

The biometric authentication device may perform a so-called 1:N authentication. In this case, the storage unit of the biometric authentication device stores data concerning registered biometric information for each of the plurality of registered users. The processing unit calculates a connection candidate for each registered user, and calculates the partial similarity for each of connection candidates of each registered user. When the maximum value of the partial similarity is equal to or higher than the authentication judging threshold, the processing unit authenticates the user as the registered user corresponding to the maximum value.

Further, the biometric authentication devices and biometric authentication methods disclosed in the present application are applicable to a variety of devices or systems in which a biometric authentication process between the biometric information of a user and the preregistered biometric information is performed for a user to perform any operation.

Figure 10:
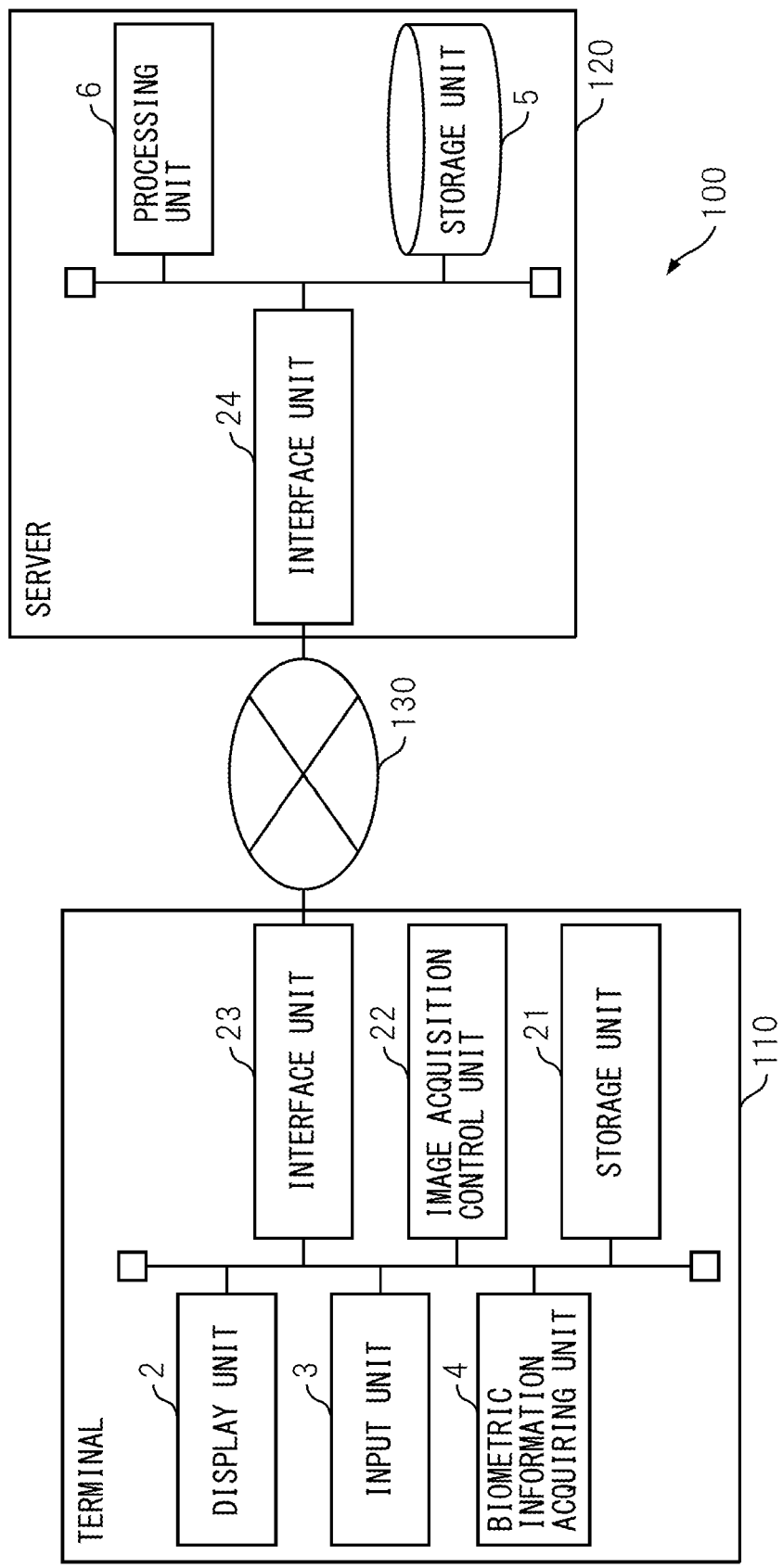
FIG. 10 is a diagram schematically illustrating one example of a computer system on which a biometric authentication device according to any of the above-mentioned embodiments or modified examples thereof is mounted.

FIG. 10 is a diagram schematically illustrating one example of a computer system on which a biometric authentication device according to the above-mentioned embodiment or modified examples thereof is mounted.

For example, a computer system 100 includes at least one terminal 110 and one server 120. The terminal 110 and the server 120 are connected via a wired or wireless communication network 130. In FIG. 10, among the components which the computer system 100 includes, the component corresponding to any of the components which the biometric authentication device 1 illustrated in FIG. 1 includes is provided with the same reference numeral as that of the component which the biometric authentication device 1 includes.

In this system, the terminal 110 is a portable terminal such as a cellular phone or a tablet-type terminal, or a fixedly installed terminal, and includes a display unit 2, an input unit 3 and a biometric information acquiring unit 4. Further, the terminal 110 includes a storage unit 21, an image acquisition control unit 22, and an interface unit 23.

The storage unit 21 includes, for example, a semiconductor memory circuit, and temporarily stores a partial image generated by the biometric information acquiring unit 4. The image acquisition control unit 22 includes one or a plurality of processors and peripheral circuits thereof, controls each unit of the terminal 110, and performs a variety of programs operated in the terminal 110. The image acquisition control unit 22 sequentially transmits a partial image generated by the biometric information acquiring unit 4 via the interface unit 23 including an interface circuit for connecting the terminal 110 via the communication network 130 to the server 120. Further, the image acquisition control unit 22 may also transmit user identification information input by the input unit 3 to the server 120.

To each unit of the terminal 110, for example, power is supplied from a power source (not illustrated) such as a lithium-ion battery or a power circuit connected to a commercial power source. The biometric information acquiring unit 4 includes a contact sensor which detects that a user touches the biometric information acquiring unit 4, and the terminal 110 may stop power supply to each unit which has no relevance to the biometric authentication process until the user touches the biometric information acquiring unit 4 in order to reduce the power consumption of the power source. Further, the terminal 110 may stop power supply to each unit which is not needed for generating a partial image and transmitting a partial image after the user touches the biometric information acquiring unit 4. The image acquisition control unit 22 may include a partial image acquisition control processor which performs a process relating to the generation of a partial image and transmission of the partial image, and a processor which performs other processes performed in the terminal 110, separately. In this case, the terminal 110 may supply power to the partial image acquisition control processor until the generation of a partial image and the transmission of the partial image are completed, and power supply to other processors may be stopped.

The server 120 includes the storage unit 5, the processing unit 6, and an interface unit 24 including an interface circuit for connecting the server 120 to the communication network 130. The processing unit 6 of the server 120 performs a biometric authentication process by attaining each function which the processing units according any of the above-mentioned embodiments or modified examples thereof have by using partial images sequentially received via the interface unit 24. The server 120 replies a judgment result whether authentication was successful or not to the terminal 110 via the interface unit 24.

FIG. 11 is a timing diagram of a process performed on the terminal 110 and the server 120 when a biometric authentication process is performed on the computer system 100.

When user identification information is input to the terminal 110 via the input unit 3, the biometric information acquiring unit 4 is initialized (step S301). When the user touches the biometric information acquiring unit 4, the biometric information acquiring unit 4 sequentially generates a plurality of partial images at a constant time interval, and passes them to the image acquisition control unit 22 (step S302). Every time the image acquisition control unit 22 receives a partial image from the biometric information acquiring unit 4, the image acquisition control unit 22 temporarily stores the partial image into the storage unit 21.

The image acquisition control unit 22 generates initial data to be transmitted by attaching information for representing the relative relationship between the partial images such as reading start time or reading completion time and identification information of the terminal 110 or the like to the initially generated partial image (step S303). The image acquisition control unit 22 may encrypt each partial image; alternatively each partial image may be compressed. Further, the image acquisition control unit 22 may add an error-correcting code to data to be transmitted. The image acquisition control unit 22 transmits the data to be transmitted and an authentication request signal containing identification information of the terminal 110 and identification information of the user to the server 120 via the interface unit 23 (step S304).

On the other hand, when the processing unit 6 of the server 120 receives an authentication request signal and initial data to be transmitted via the interface unit 24, the processing unit 6 starts a session of a biometric authentication process for the terminal 110 specified by identification information contained in the authentication request signal (step S305). The processing unit 6 reads from the storage unit 5 data concerning registered biometric information of a registered user specified by user identification information (step S306). The processing unit 6 performs a biometric authentication process based on each partial image such as calculation of the correlation value, calculation of the partial similarity and authentication judgment (step S307).

The terminal 110 generates next data to be transmitted by attaching information for representing the relative relationship between partial images and identification information of the terminal 110 or the like to the next generated partial image (step S308). The image acquisition control unit 22 transmits data to be transmitted to the server 120 via the interface unit 23 (step S309). From then on, the terminal 110 repeats the generation and transmission of data to be transmitted until all partial images are transmitted or until a message representing a judgment result whether the authentication is successful or not from the server 120 is received.

When the processing unit 6 of the server 120 receives the next data to be transmitted via the interface unit 24, the processing unit 6 performs a biometric authentication process based on a partial image contained in the transmitted data such as the calculation of the correlation value, the update of the partial similarity, or an authentication judgment (step S310).

After that, the processing unit 6 repeats the process of the step S310 every time the processing unit 6 receives data containing a partial image from the terminal 110 until it is judged that the authentication is successful or until it is judged that the authentication is unsuccessful. When the elapsed time from time when the previous data to be transmitted is received to time when the next data to be transmitted is received exceeds a predetermined period of time, the processing unit 6 may notify time out to the terminal 110 and complete the session.

When it is judged that the authentication is successful or it is judged that the authentication is unsuccessful, the processing unit 6 replies a message representing the judgment result to the terminal 110 via the interface unit 24 (step S311). The processing unit 6 completes the session, and deletes information such as partial images utilized for performing the session which is temporarily stored in the storage unit 5. The processing unit 6 updates, for a registered user specified by user identification information, an access log stored in the storage unit 5 recording time when the biometric authentication process is performed (for example, session start time), the authentication result and the like.

When the authentication is successful, a server 110 may also transmit setting information of the user interface concerning the registered user specified by user identification information to the terminal 110. When the terminal 110 receives a message representing the judgment result, the terminal 110 displays a message corresponding to the judgment result (step S312). When the server 120 is successful in authentication, the terminal 110 permits a user to utilize the terminal 110 or the computer system 100. On the other hand, when the server 120 fails in authentication, the terminal 110 denies the user from utilizing the terminal 110 and the computer system 100.

The computer system 100 completes the biometric authentication process. The image acquisition control unit 22 of the terminal 110 may perform processes of the step S308 and S309 every time the image acquisition control unit 22 receives a partial image from the biometric information acquiring unit 4.

In this embodiment, since the processing unit 6 of the server 120 only performs a biometric authentication process, and the terminal 110 only performs a process relating to the generation and transmission of a partial image, load of a processor which the terminal 110 includes is reduced. For this reason, the terminal 110 may include a processor having a relatively low throughput.

Further, the image acquisition control unit of the terminal may have a function of partial feature extraction unit and relative relationship information calculation unit among the functions of the processing units of the above-mentioned individual embodiment. On the other hand, the processing unit of the server may perform functions of a correlation value calculation unit, a similarity update unit and an authentication judging unit. Further, the processor of the server may perform a function of the overall matching unit. By this, the load of a process for the processor of the server can be reduced.

A processing unit of a transportable memory device which is integrally formed by a biometric information acquiring unit, a storage unit, a processing unit, and a data transmission interface according to a standard such as Universal Serial Bus may have functions of the processing unit in the above-mentioned embodiment.

A computer program including an instruction for allowing a computer to execute the function of the processing unit according to any of the above-mentioned embodiments may be provided in the form of being recorded in a recording medium such as a magnetic recording medium, an optical recording medium or a nonvolatile semiconductor memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, Substitutions, and alterations could be made hereto without departing from the spirit and scope of the invention.

What is claimed is:

1. A biometric authentication device comprising:
    a biometric information acquiring unit which generates a plurality of partial images, each of the partial images capturing a portion of biometric information of a user different from each other;
    a storage unit which stores data concerning registered biometric information of a registered user;
    a correlation value calculation unit which, when receiving one partial image of the plurality of partial images from the biometric information acquiring unit, calculates a correlation value between a portion of biometric information represented on the one partial image and the registered biometric information;
    a partial similarity update unit which, based on the correlation value for the one partial image and the correlation value for at least one other partial image acquired before the one partial image, updates partial similarity representing the degree of similarity between the registered biometric information and portions of biometric information represented on the one partial image and the at least one other partial image;
    an authentication unit which authenticates, when the partial similarity is equal to or higher than an authentication judging threshold, the user as the registered user; and
    an image loading unit which loads the next partial image of the one partial image from the biometric information acquiring unit when the partial similarity is lower than the authentication judging threshold.

2. The biometric authentication device according to claim 1, further comprising
a relative relationship information calculation unit which, based on a portion of biometric information represented on each of two successive partial images of the plurality of partial images, calculates a relative positional relationship between reference points of the two successive partial images, wherein
the partial similarity update unit makes the partial similarity higher as the difference between the relative positional relationships of each of two successive partial images represented on the one partial image and the at least one of other partial images is smaller.

3. The biometric authentication device according to claim 1, further comprising
a relative relationship information calculation unit which, based on a portion of biometric information represented on each of two successive partial images of the plurality of partial images, calculates the relative movement speed of a body part carrying the biometric information of the user to the biometric information acquiring unit, from the relative positional relationship which is the positional difference between reference points in the two successive partial images and the acquired time interval of the two successive partial images, wherein
the partial similarity update unit makes the partial similarity higher as the difference between the relative movement speeds of each of two successive partial images contained in the one partial image and the at least one of other partial images is smaller.

4. The biometric authentication device according to claim 2, wherein
the correlation value calculation unit calculates, for each of the one partial image and the at least one other partial image, at least one matching candidate position on a registered biometric image representing the registered biometric information at which the correlation value is equal to or higher than a predetermined first threshold, and determines at least one connection candidate which includes one matching candidate position of the one partial image and one matching candidate position of each of the at least one other partial image,
the partial similarity update unit updates the partial similarity for each of the at least one connection candidate.

5. The biometric authentication device according to claim 4, wherein
the relative relationship information calculation unit calculates, as the relative positional relationship, the positional difference between the reference points of the two successive partial images when the degree of similarity between portions of biometric information represented on the two successive partial images is equal to or higher than a second threshold, and
when there exist a plurality of the connection candidates and a plurality of the matching candidate positions for the last partial image prior to the one partial image, the correlation value calculation unit calculates the candidate position distances between the matching candidate position for the one partial image and each of the matching candidate positions for the last partial image and includes the matching candidate position for the one partial image in the connection candidate to which the matching candidate position for the last partial image belongs, the matching candidate position for the last partial image corresponding to the candidate position distance which is the closest to the positional difference between the reference points between the one partial image and the last partial image.

6. The biometric authentication device according to claim 4, further comprising
a selecting unit which, when a portion of biometric information represented on the partial image obtained by arranging the partial image corresponding to each of the matching candidate position contained in the connection candidate is arranged is not matched with any portion of the registered biometric information, deletes the connection candidate.

7. The biometric authentication device according to claim 6, wherein the selecting unit deletes a connection candidate of the at least one connection candidate whose the corresponding partial similarity is equal to or lower than a tracking stopping threshold which is lower than the authentication judging threshold.

8. The biometric authentication device according to claim 6, wherein
the biometric information acquiring unit sequentially generates the plurality of partial images while a body part carrying the biometric information of the user moves relatively with respect to the biometric information acquiring unit,
the relative relationship information calculation unit calculates the movement direction between portions of biometric information represented on two successive partial images as the relative positional relationship, and
the selecting unit deletes, among the at least one connection candidate, a connection candidate in which the movement direction between portions of biometric information represented on each of two successive partial images reverses more than a predetermined times.

9. The biometric authentication device according to claim 6, wherein
the biometric information acquiring unit sequentially generates the plurality of partial images while a body part carrying the biometric information of the user moves relatively with respect to the biometric information acquiring unit,
the selecting unit deletes, among the at least one connection candidate, a connection candidate in which the sum of differences between the reference points for each of two successive partial images is larger than the sum of the size of the partial image along the movement direction of the body part.

10. The biometric authentication device according to claim 1, wherein the partial similarity update unit makes the partial similarity higher as the total number of the one partial image and the at least one other partial image is larger.

11. The biometric authentication device according to claim 4, further comprising
an overall matching unit which, when the partial similarity is lower than the authentication judging threshold when the partial images are acquired such that the overall biometric information is represented thereon, generates, for each of the connection candidates survived after the last partial image is acquired, a composite image representing the overall biometric information by compositing each partial image such that matching positions of portions of biometric information represented on the partial images overlap each other; and authenticate the user as the registered user when the biometric information represented on the composite image and the registered biometric information are matched with each other, on the other hand, does not authenticate the user when the biometric information represented on the composite image and the registered biometric information are not matched with each other.

12. The biometric authentication device according to claim 1, comprising
a terminal including the biometric information acquiring unit and
a server including the storage unit, the correlation value calculation unit, the partial similarity update unit, the authentication unit and the image loading unit, wherein the terminal and the server are connected via a communication network; the terminal transmit each of the plurality of partial images sequentially to the server; and every time the server receives the partial image from the terminal, the correlation value calculation unit calculates the correlation value; the partial similarity update unit updates the partial similarity; and the authentication unit judge whether the user is authenticated as the registered user or not based on the updated partial similarity.

13. A biometric authentication method comprising:
generating a plurality of partial images by a biometric information acquiring unit, each of the partial images capturing a portion capturing portions of biometric information of a user different from each other;
calculating the correlation value between a portion of biometric information represented on the first partial image among the plurality of partial images and registered biometric information of a registered user by a processor;
updating a partial similarity representing degree of similarity of portions of biometric information represented on the first partial image and at least one other partial image acquired before the first partial image with the registered biometric information based on the correlation value for the first partial image and the correlation value for at least one other partial image by the processor;
performing authentication judgment in which when the partial similarity is equal to or higher than an authentication judging threshold, the user is authenticated as the registered user by the processor; and
acquiring the next partial image of the first partial image when the partial similarity is smaller the authentication judging threshold, setting the next partial image to the first partial image, and performing calculating the correlation value, updating the partial similarity and the authentication judgment by the processor.

14. The biometric authentication method according to claim 13, further comprising
based on a portion of biometric information represented on each of two successive partial images of the plurality of partial images, calculating a relative positional relationship between reference points of the two successive partial images by the processor, wherein
the updating the partial similarity makes the partial similarity higher as the difference between the relative positional relationships of each of two successive partial images represented on the one partial image and the at least one of other partial images is smaller.

15. The biometric authentication method according to claim 13, further comprising
based on a portion of biometric information represented on each of two successive partial images of the plurality of partial images, calculating the relative movement speed of a body part carrying the biometric information of the user to the biometric information acquiring unit, from the relative positional relationship which is the positional difference between reference points in the two successive partial images and the acquired time interval of the two successive partial images by the processor, wherein
the updating the partial similarity makes the partial similarity higher as the difference between the relative movement speeds of each of two successive partial images contained in the one partial image and the at least one of other partial images is smaller.

16. The biometric authentication method according to claim 14, wherein
the calculating the correlation value calculates, for each of the one partial image and the at least one other partial image, at least one matching candidate position on a registered biometric image representing the registered biometric information at which the correlation value is equal to or higher than a predetermined first threshold, and determines at least one connection candidate which includes one matching candidate position of the one partial image and one matching candidate position of each of the at least one other partial image,
the updating the partial similarity updates the partial similarity for each of the at least one connection candidate.

17. The biometric authentication method according to claim 16, wherein
the calculating the relative positional relationship calculates, as the relative positional relationship, the positional difference between the reference points of the two successive partial images when the degree of similarity between portions of biometric information represented on the two successive partial images is equal to or higher than a second threshold, and
when there exist a plurality of the connection candidates and a plurality of the matching candidate positions for the last partial image prior to the one partial image, the calculating the correlation value calculates the candidate position distances between the matching candidate position for the one partial image and each of the matching candidate positions for the last partial image and includes the matching candidate position for the one partial image in the connection candidate to which the matching candidate position for the last partial image belongs, the matching candidate position for the last partial image corresponding to the candidate position distance which is the closest to the positional difference between the reference points between the one partial image and the last partial image.

18. The biometric authentication method according to claim 16, further comprising
when a portion of biometric information represented on the partial image obtained by arranging the partial image corresponding to each of the matching candidate position contained in the connection candidate is arranged is not matched with any portion of the registered biometric information, deleting the connection candidate.

19. The biometric authentication method according to claim 18, wherein the deleting the connection candidate deletes a connection candidate of the at least one connection candidate whose the corresponding partial similarity is equal to or lower than a tracking stopping threshold which is lower than the authentication judging threshold.

20. The biometric authentication method according to claim 18, wherein
the biometric information acquiring unit sequentially generates the plurality of partial images while a body part carrying the biometric information of the user moves relatively with respect to the biometric information acquiring unit, the calculating the relative positional relationship calculates the movement direction between portions of biometric information represented on two successive partial images as the relative positional relationship, and the deleting the connection candidate deletes, among the at least one connection candidate, a connection candidate in which the movement direction between portions of biometric information represented on each of two successive partial images reverses more than a predetermined times.

21. The biometric authentication method according to claim 18, wherein the biometric information acquiring unit sequentially generates the plurality of partial images while a body part carrying the biometric information of the user moves relatively with respect to the biometric information acquiring unit, the deleting the connection candidate deletes, among the at least one connection candidate, a connection candidate in which the sum of differences between the reference points for each of two successive partial images is larger than the sum of the size of the partial image along the movement direction of the body part.

22. The biometric authentication method according to claim 13, wherein the updating the partial similarity makes the partial similarity higher as the total number of the one partial image and the at least one other partial image is larger.

23. The biometric authentication method according to claim 16, further comprising when the partial similarity is lower than the authentication judging threshold when the partial images are acquired such that the overall biometric information is represented thereon, generating, for each of the connection candidates survived after the last partial image is acquired, a composite image representing the overall biometric information by compositing each partial image such that matching positions of portions of biometric information represented on the partial images overlap each other; and authenticating the user as the registered user when the biometric information represented on the composite image and the registered biometric information are matched with each other, on the other hand, does not authenticate the user when the biometric information represented on the composite image and the registered biometric information are not matched with each other.

24. A non-transitory computer-readable recording medium having recorded thereon a biometric authentication computer program that causes a computer to execute a process comprising:

calculating the correlation value between registered biometric information of a registered user and a portion of biometric information represented on the first partial image among the plurality of partial images, each of the partial images capturing a portion of biometric information of a user different from each other;

updating a partial similarity representing degree of similarity of portions of biometric information represented on the first partial image and at least one other partial image acquired before the first partial image with the registered biometric information based on the correlation value for the first partial image and the correlation value for the at least one other partial image;

performing authentication judgment in which when the partial similarity is equal to or higher than an authentication judging threshold, the user is authenticated as the registered user; and acquiring the next partial image of the first partial image when the partial similarity is smaller the authentication judging threshold, setting the next partial image to the first partial image, and performing calculation of the correlation value, update of the partial similarity and the authentication judgment.

* * * * *